United States Patent [19]
Graber et al.

[11] Patent Number: 5,162,986
[45] Date of Patent: Nov. 10, 1992

[54] REMOTE DOWNLOADING AND UPLOADING OF MOTION CONTROL PROGRAM INFORMATION TO AND FROM A MOTION CONTROL I/O MODULE IN A PROGRAMMABLE CONTROLLER

[75] Inventors: Mark S. Graber, Streetsboro; Kris M. Fraley, Huntsburg; Steven M. Zink, Hudson; R. Jay Jeffery, Mentor, all of Ohio; Paul J. Epner, Grafton, Wis.

[73] Assignee: Allen-Bradley Company, Inc., Milwaukee, Wis.

[21] Appl. No.: 600,631

[22] Filed: Oct. 19, 1990

[51] Int. Cl.$^5$ .................. G06F 15/46; G06F 13/14
[52] U.S. Cl. ........................... 364/146; 364/147; 364/136; 364/DIG. 2; 364/926.9; 364/949; 364/957.1; 395/275
[58] Field of Search .............. 364/140, 141, 146, 147, 364/136, DIG. 1 MS File, DIG. 2 MS File; 395/200, 275, 325

[56] References Cited
U.S. PATENT DOCUMENTS

| | | | |
|---|---|---|---|
| 4,488,258 | 12/1984 | Struger et al. | 364/146 |
| 4,510,565 | 4/1985 | Dummermuth | 364/136 |
| 4,742,443 | 5/1988 | Rohn et al. | 364/136 |
| 4,747,100 | 5/1988 | Roach et al. | 370/86 |
| 4,858,101 | 8/1989 | Stewart et al. | 364/147 X |
| 4,888,726 | 12/1989 | Struger et al. | 364/900 |
| 4,942,552 | 7/1990 | Merrill et al. | 364/900 |
| 4,972,365 | 11/1990 | Dodds et al. | 364/136 |

*Primary Examiner*—Joseph Ruggiero
*Attorney, Agent, or Firm*—Quarles & Brady

[57] ABSTRACT

High-level language motion control programs are downloaded and uploaded between a programming terminal and a remotely located I/O module through a peer-to-peer network and a programmable controller system processor. Automatic block transfer between the programmable controller system processor and the I/O module is executed in response to commands from the programming terminal. The programmable controller processor and motion control I/O module are modified to handle two types of block transfers, the first controlled from the user applications program of the programmable controller processor, and the second controlled from the programming terminal.

12 Claims, 21 Drawing Sheets

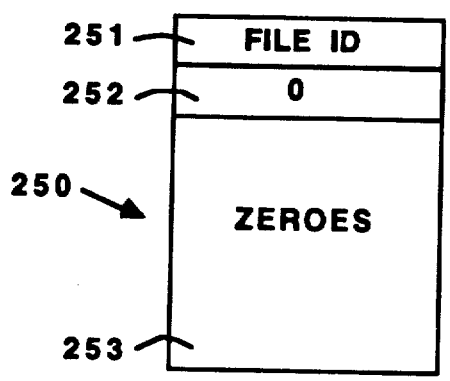
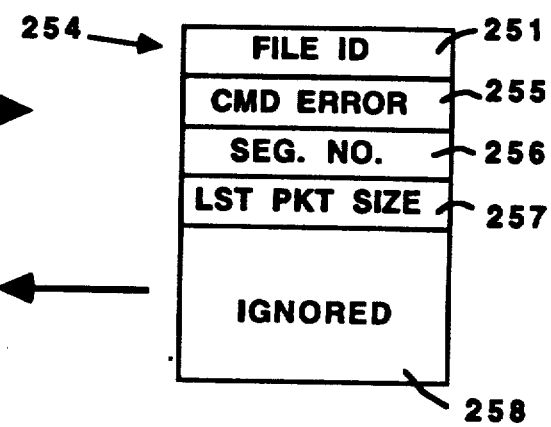
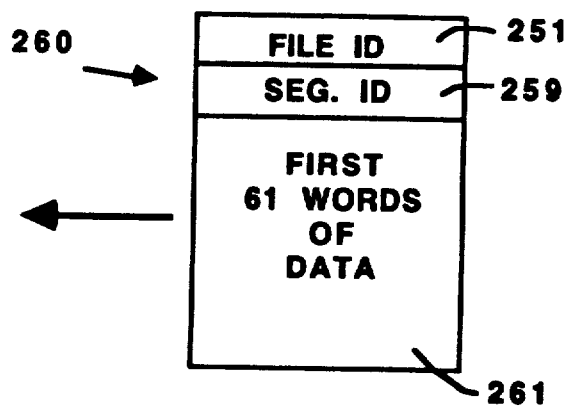
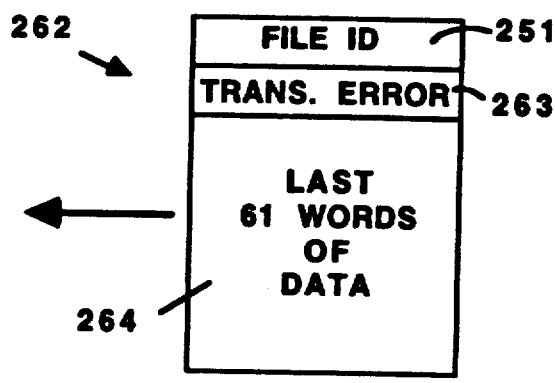
FIG. 22

FIG. 27

REMOTE DOWNLOADING AND UPLOADING OF MOTION CONTROL PROGRAM INFORMATION TO AND FROM A MOTION CONTROL I/O MODULE IN A PROGRAMMABLE CONTROLLER

BACKGROUND OF THE INVENTION

1. Field of the Invention

The field of the invention is electronic controllers, including programmable controllers, numerical controls and motion controllers.

2. Description of the Background Art

A programmable controller for controlling industrial machines and processes typically has a PC system processor and a group of input and output (I/O) interface modules mounted in a chassis. A slot at the left end can accommodate a programmable controller processor module. The I/O modules are mounted in the slots of the chassis not occupied by the programmable controller processor.

In early programmable controllers, I/O modules were designed to be wired to discrete output devices such as solenoids, relays and motor starters or to discrete input devices such as limit switches, photoelectric sensors and proximity sensors. Later, more complex I/O modules were developed to control analog input and output devices, and to sense and control variables such as position, velocity or temperature. More recently, the assignee of the present invention has introduced a single-axis motion control I/O module which may be situated in a programmable controller chassis with a programmable controller processor, and which communicates data with the programmable controller processor during an I/O scan of modules in the rack. Unlike prior I/O modules, however, these motion control I/O modules receive motion control programs, compiled from a high-level language, through a programming port on the front of the I/O module. The programs executed by the motion control I/O modules, may in some instance be longer, more complex and more sophisticated than the control program executed by programmable controller processor in the same equipment rack. The programmable controller processor, however, is useful in transferring certain motion commands and parameter data to the motion control I/O module for execution in conjunction with the high-level language program.

There remains, however, a problem in programming these motion control I/O modules, in that in a large facility, they may be distributed in chassis at many remote locations. The only access for programming the single-axis modules was through direct connection to a port on the front of the module. This requires that technical personnel walk from location to location, between programming tasks, moving the programming terminal to the next individual location and connecting it to the next module. It would therefore be desirable for the motion control I/O modules to be programmed more efficiently.

In recent years, programmable controller processors have been connected with programmable processors in other equipment racks through peer-to-peer networks as disclosed in Roach et al., U.S. Pat. No. 4,747,100, issued May 24, 1988. A rack-based programmable controller processor suitable for peer-to-peer communications is disclosed in Rohn et al. U.S. Pat. No. 4,742,443, issued May 3, 1988. A programming terminal may be connected to these networks to download programs to programmable controller system processors when these processors are placed in a PROGRAM mode. There has not been, however, a suitable method to download programming files through the programmable controller system processor to I/O modules.

SUMMARY OF THE INVENTION

The invention relates to methods for transferring program information between a programming terminal and an I/O module through a programmable controller system processor.

According to one method of the invention, a programming terminal is connected to communicate with the programmable controller system processor through a peer-to-peer network.

A mode of communication is selected for the programming terminal to designate a peer-to-peer network for transfer of program information between the programming terminal and the I/O module through the programmable controller processor. The user is then prompted to enter information including a system-mapped I/O address for the I/O module.

The user then enters a command to download or upload the program information between the programming terminal and the I/O module through the programmable controller system processor.

This command is included in a message packet with the programmable controller system-mapped I/O address and is transmitted to the programmable controller system processor.

In response to this command, the transfer of program information is executed between the programming terminal and the programmable controller system processor through the peer-to-peer network and is also executed between the programmable controller system processor and the I/O module using a block transfer mode of communication.

In prior systems, block transfers were limited to special instructions entered in the control program or ladder program of the programmable controller processor. These were executed during the program scan with the target I/O module.

With the invention, the receipt of an upload or download command over the peer-to-peer network causes the entry of a block transfer request in a queue area in memory along with queue entries resulting from execution of block transfer instructions in the control program or ladder program of the local programmable controller processor.

The invention further provides for embedding the commands and file sequence numbers in blocks of motion program information to enable the file to be transferred as a sequence of blocks of program information.

The invention further provides a semi-handshaking method in which the first block sent from the programming terminal causes a reply block to be returned with the status determining whether the command will be executed. The method further provides for sending a second reply block to the programming terminal to conclude the file transfer and confirm that the data was successfully transferred between the programmable controller system processor and the I/O module.

As used herein, the term "motion program information" may broadly include program source statements originated in a high-level language, compiled executable versions of such statements, data values for variables and parameters operated upon by programs, and configuration data and parameters for operation of I/O modules.

As used herein, the term "I/O module" in its broadest context includes both machine-interface units, as well as human-operator interface units and visual display interface units.

Other objects and advantages besides those discussed above shall be apparent to those familiar with the art from the description of several preferred embodiments of the invention which follow. In the description, reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

BRIEF DESCRIPTION OF THE DRAWINGS

FIG. 22 is a map of blocks of data illustrating a semi-handshake protocol for the upload operation;

FIGS. 25-27 are flow charts illustrating subroutines executed by the motion planning processor of FIG. 12.

DETAILED DESCRIPTION OF THE PREFERRED EMBODIMENTS

A. The Prior System

Figure 1:
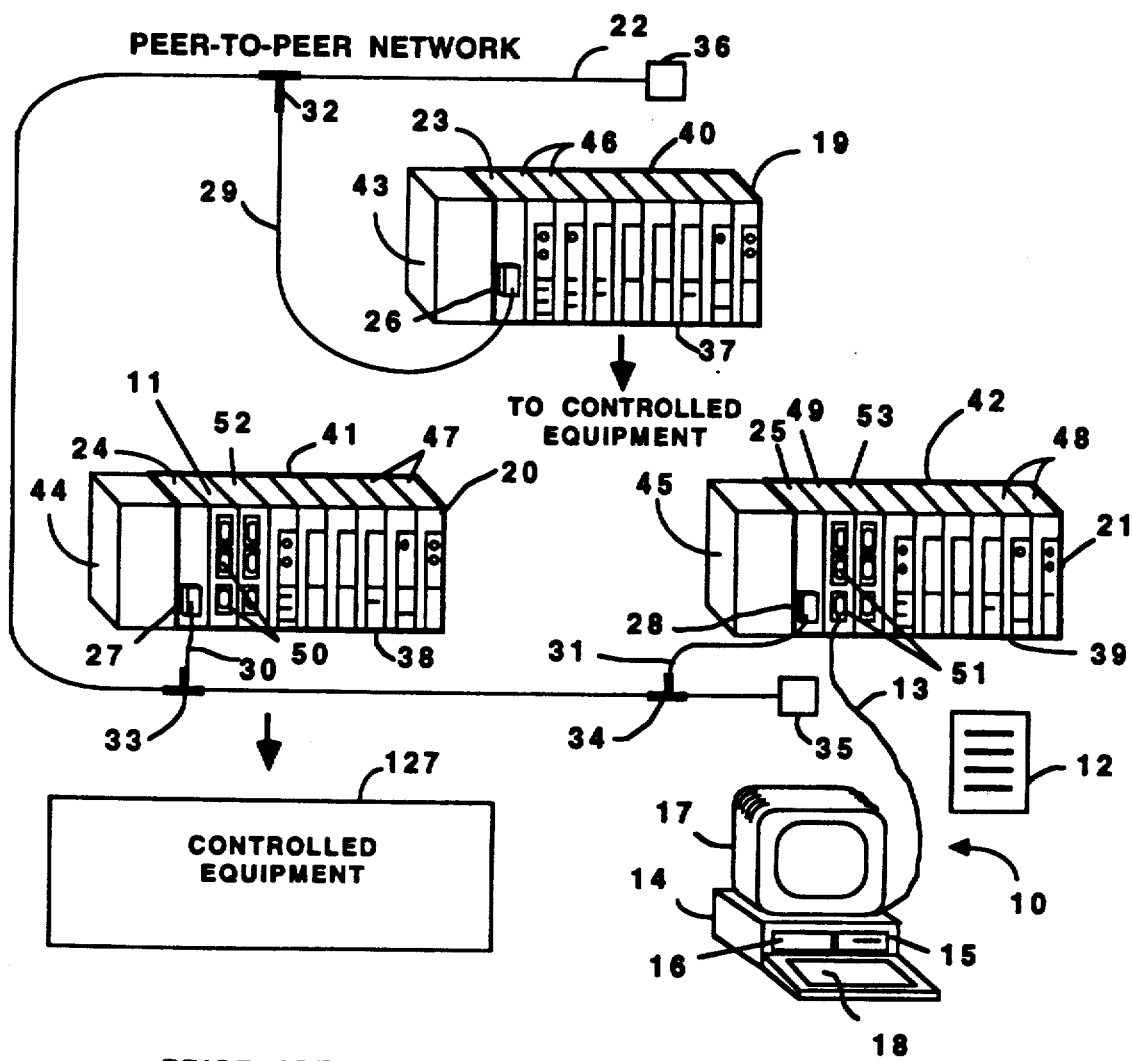
FIG. 1 is a system diagram of a programmable controller system of the prior art.

FIG. 1 shows a system for practicing the prior known method of downloading files 12 of motion program information into a motion control I/O module 49 through a direct-connect cable 13. In this description, motion program information is a term that broadly describes either AMP (Adjustable Machine Parameters) files or MML (Motion Management Language) files, these two types being further described later herein. In the prior system files 12 were downloaded from a programming terminal 10 known as the ODS (Offline Development System) where MML files were originated and compiled from a high-level language to a form for execution on the motion control I/O module 49. The motion control I/O module 49 was the IMC-120 single-axis motion control module offered by the assignee of the present invention.

The programming terminal 10 includes an Allen-Bradley T50 industrial programming computer, or an IBM PC/AT or equivalent desktop computer 14 with one disk drive 15, 640 kilobytes of internal RAM memory (not shown) and a 10-megabyte hard disk 16. The computer 14 is loaded with a suitable edition of the MS-DOS operating system and with a first version of the software known as Offline Development System (ODS) software offered by the assignee of the present invention. A suitable monitor 17 is equipped with a suitable controller card and is connected to the computer 14 to provide for visual output to the user. A keyboard 18 connects to a port on the computer for entry of commands and data.

The motion control I/O module 49 is an I/O module in one of three local programmable controller systems 19, 20 and 21 which communicate through a peer-to-peer network 22. Each local programmable controller system 19, 20 and 21 has a corresponding local system processor module 23, 24, 25 which connects to the network 22 through a respective connector on its front 26, 27, 28, a respective drop line 29, 30, 31, and a respective T-connector 32, 33, 34. Each end of the network physical link is connected to a termination device 35, 36.

The local system processor module is one of the PLC-5 family of processors offered by the assignee of the present invention, one of which has been described in Rohn et al., U.S. Pat. No. 4,742,443, issued May 3, 1988. The peer-to-peer network 22 is Data Highway Plus (DH+) offered by the assignee of the present invention. This network 22 has been disclosed in Roach et al., U.S. Pat. No. 4,747,100, issued May 24, 1988 and Merrill et al., U.S. Pat. No. 4,942,552, issued Jul. 17, 1990.

Each local programmable controller system 19, 20 and 21 is mounted in a chassis 37, 38, 39. Each chassis has a backplane motherboard 40, 41, 42, or simply "backplane" extending across the back of the chassis 37, 38, 39 with printed circuit paths for carrying signals between the modules in each respective chassis 37, 38, 39. A power supply 43, 44, 45 is mounted on a left sidewall of this chassis 37, 38, 39, and supplies power through the backplane 40, 41 and 42 and through cables (not shown) to other parts of each respective programmable controller system. The local system processor module 23, 24, 25 is supported in a left-most slot formed by the chassis 37, 38, 39. The other slots in the chassis 37, 38, 39 support I/O modules, which may be of several types.

The I/O modules 46 in the first chassis and the I/O modules 47, 48 in the second and third chassis are discrete I/O modules. These modules 46–48 connect through wiring (not shown) to ON/OFF type devices on controlled equipment 127. The I/O modules 46–48 that are input modules convert AC and DC signals from input devices, such as sensors, limit switches and push-buttons, to digital logic-level signals that can be stored as input data. The I/O modules 46–48 that are output modules convert digital logic-level signals to AC and DC signals for operating output devices such as relays and solenoids.

Two I/O modules 11, 49 are single-axis motion controller modules of the type offered by the assignee of the present invention under the trade designation, IMC-120. These are double-sized I/O modules, each with two circuit boards, which are inserted in two slots that would normally support two discrete I/O modules. These modules have a number of D-shell type connectors 50, 51 of various sizes for connection to analog output and analog or encoder input lines of the type which are typically connected to servomechanisms for controlling motion along an axis. Next, to these are two resolver excitation modules 52, 53 also with D-shell connectors to connect to lines for supplying the proper excitation signals to resolver motors which provide position and velocity feedback.

The processor modules 23, 24, 25 execute a control program, sometimes also referred to as a user's application program, because the program is developed in a user program language for one of many possible industrial applications. In executing the program, the controller processor module 23, 24, 25 generates output status data in response to the state of input status data and according to the logic contained in the user control program.

After each such "program scan" as it is called, the controller processor modules 23–25 executes an "I/O scan" in which input status data is read from those of the discrete I/O modules 46–48 that are input modules, and output status data is written to those of the discrete I/O modules 46–48 that are output modules. The I/O data are transferred through the backplanes 40, 41, 42 between the processor modules and the I/O modules 46–48 byte-by-byte with each byte being transferred to or from an addressable "slot" or I/O module 46–48 connected to the backplane 40, 41, 42. The processor modules 23–25 can also execute "block transfers" of data in which a large number of words of data are transferred to one addressable slot or module connected to the backplane. These types of transfers are useful in addressing specialized modules such as the motion control I/O modules 11, 49. These transfers have been previously described in Struger, U.S. Pat. No. 4,293,924 and Schultz et al., U.S. Pat. No. 4,413,319.

The prior system of FIG. 1 provided single-axis motion control I/O modules 11, 49 which were loaded with motion control information 12 through the direct cable 13 to the programming terminal 10. I/O data was also received from the local system processor modules 24–25 and included start, stop and jog commands, and speed and other parameter values which could be utilized in executing the motion statements downloaded in the programs from the programming terminal 10.

B. The System of the Invention

Figure 2:
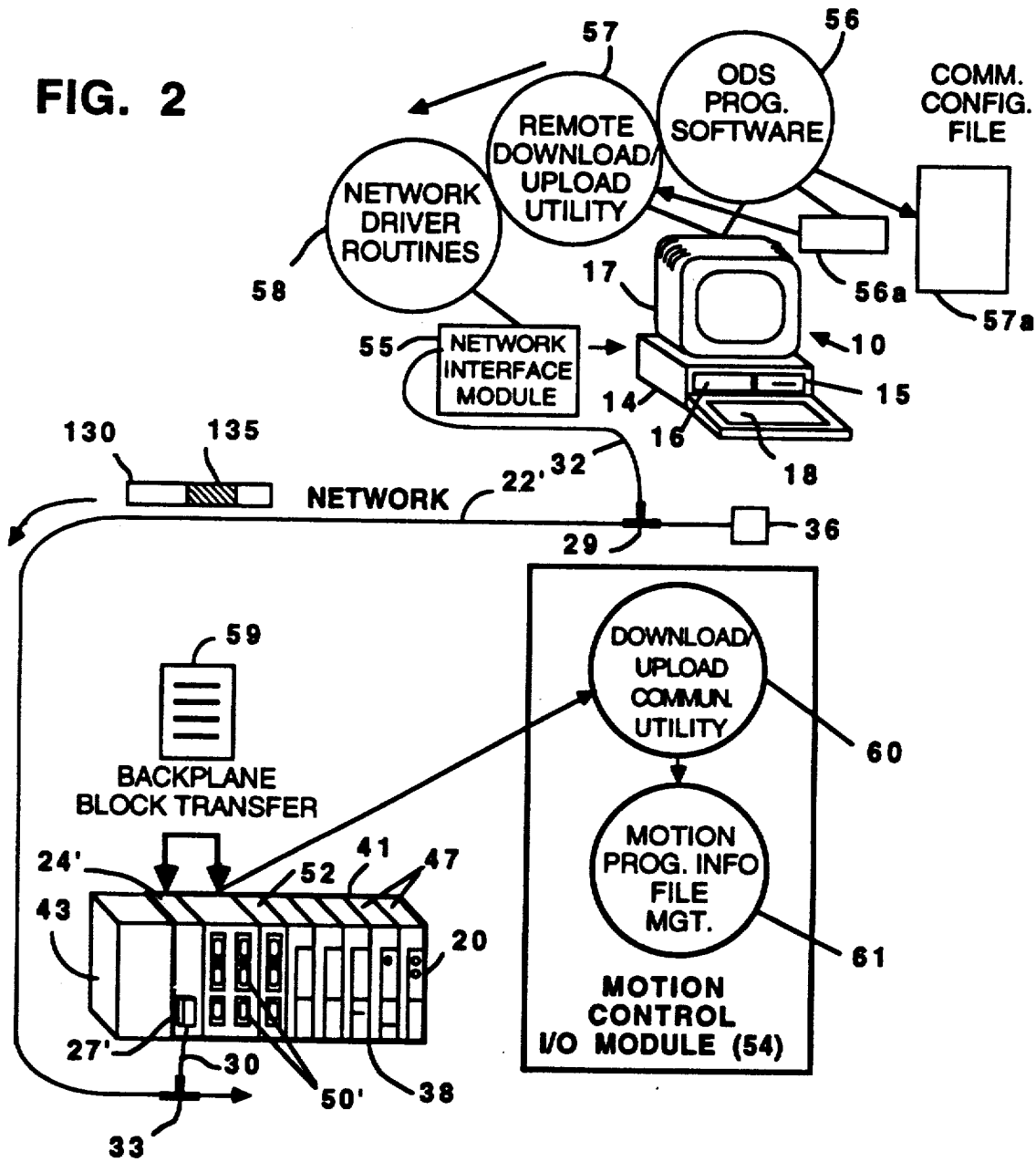
FIG. 2 is a system diagram of a programmable controller for system practicing the methods of the invention.

Turning now to FIG. 2, in the system of present invention, programs for a 3-axis motion control I/O module are downloaded and uploaded from a remote location through a peer-to-peer network 22' and a programmable controller processor 24'.

The programming terminal 10 has all of the components as described earlier and in addition, it is provided with a network interface circuit module 55 which is connected to the network at a location that is remote from the programmable controller chassis 20. Then network interface module 55 is preferably a 1784-KT interface module, a 1784-KTK1 interface module or 1770-KF2 interface box available from the assignee of the present invention. The programming terminal 10 is loaded with programming software 56 to create and download AMP and MML files. This programming software 56 has been enhanced according to the invention, as shall be explained in more detail below. One enhancement allows communication over the network and through the programmable controller processor 24' in addition to communication through a direct link to the motion control I/O module 54. In response to selecting network communication, the user is prompted to enter certain parameters in a configuration file 57a. The modified programming software 56 allows DOWN-LOAD and UPLOAD commands to be executed to the motion control I/O module 54 from a remote location along the network 22'. The programming software 56 is interfaced to network driver routines 58 by a remote download/upload utility 57 that passes key parameters from the configuration file 57a to the network driver routines 58 to generate and respond to new messages 130 over the network 22'.

MML and AMP files in the programming terminal 10 are downloaded via one or more download blocks 59, which are carried in data packets 135 in messages 130 transmitted over the network 22'. These messages 130 are received at the other end by a modified programmable controller processor module 24', which is also a transmitter of messages on the network 22'. The processor module 24' extracts the blocks 59 and transmits them via the block transfer method to the motion control I/O module 54. The processor module 24' also receives blocks 59 from the motion control I/O module 54 via block transfer and incorporates these in messages sent back to the programming terminal 10. In this way, MML and AMP files 59 can be uploaded to the programming terminal 10.

In order to handle block transfer files received through the network and to distinguish them from block transfer files originating in the processor module 24', the motion control I/O module 54 is provided with download/upload firmware routines 60 which interface to the file management firmware routines 61 on the motion control I/O module 54. The download/upload routines 60 and the file management routines 61 are executed on the motion control I/O module 54 as will be described in more detail below.

C. Executing Download and Upload Commands for AMP and MML files at the Programming Terminal FIGS. 3–9 illustrate a series of screen displays 300–306 that a user views in entering commands to upload or download motion program information from the programming terminal 10 to the motion control I/O module 54. For background on use of the programming terminal, reference is made to the Programming Manual for the prior IMC-120 Motion Control System, copyright 1988, Allen-Bradley Co. Inc.

Figure 3:
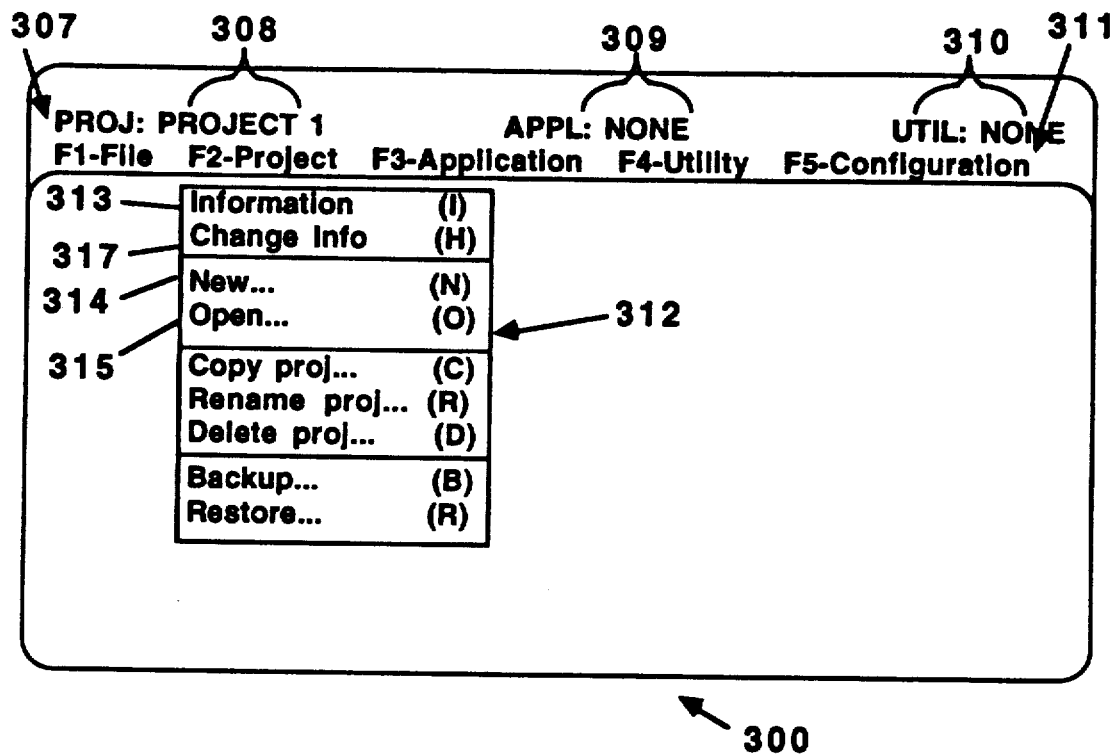
FIGS. 3-4 are screen displays showing operation of the programming terminal seen in FIG. 2.

As shown in FIG. 3, the creation of an AMP or MML file falls generally within the category of a "project" such as PROJECT 1. A header 307 is displayed as a top row that includes three active (changeable) fields 308, 309, 310, where previously selected and currently active items are shown for the project, the application, and any selected and currently running utility. Labels "PROJ:" "APPL:" and "UTIL:" appear just to the left of these fields 308, 309, 310. Below the header 307 is a horizontal menu bar 311 showing menus which can be selected and displayed by operating respective function keys F1-F5 on the keyboard 18. Individual selections within the menus are made by operating cursor keys to highlight the command or menu choice, and then operating an "ENTER" key. Whenever the description speaks of "selecting" a command or choice within a menu, it is implied that this operation is carried out.

In FIG. 3, key F2 has been operated to select and activate the "Project" menu 312. This menu 312 has commands 313 beginning with "Information" and ending with "Restore". The capital letters in parentheses to the right of each command 313 show that letter key on the keyboard 18 that can be operated in conjunction with a "COMMAND" key to choose that command. The "New" command 314 will open a new project, which the "Open" command 315 is used to open a previously created project.

Figure 4:
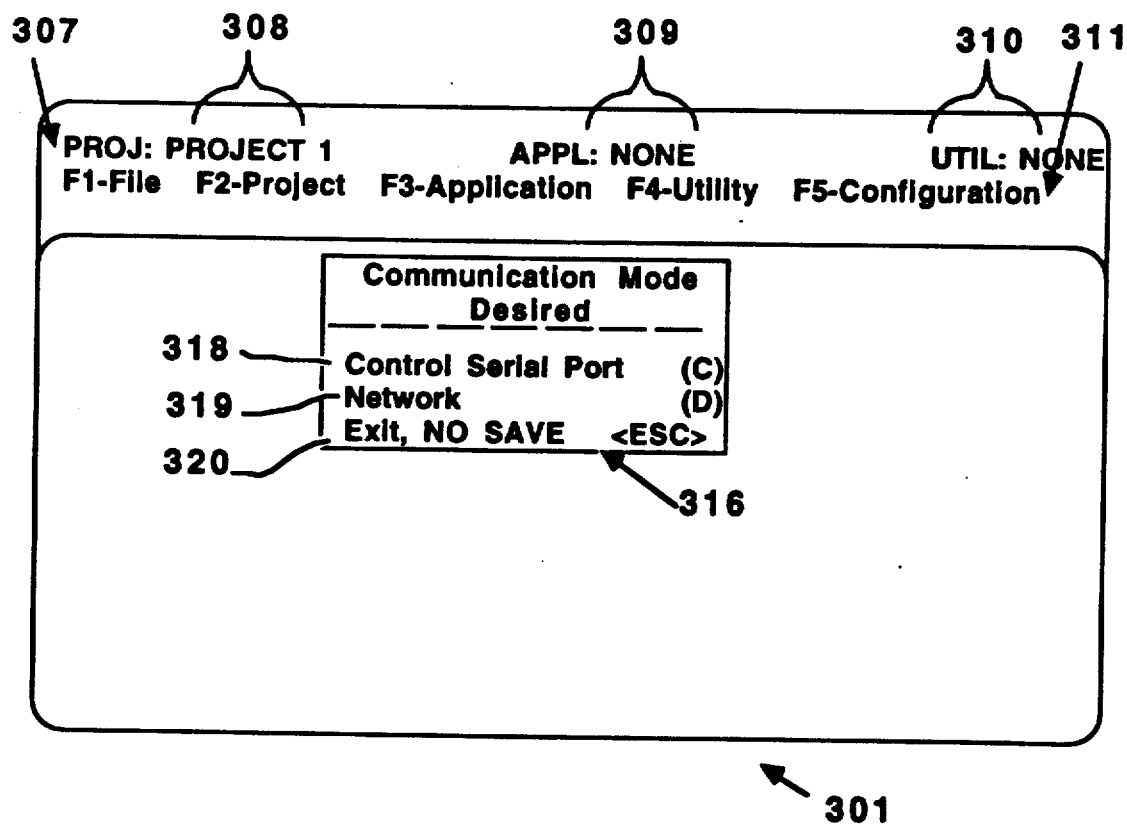

According to the invention, and as seen in FIG. 4, whenever a new project is created, a communication mode menu 316 pops open. This menu 316 is also opened when an existing project is opened, and when it is desired to change previous settings by selecting the "Change Info" command 317 from the project menu 312. The communications menu 316 is new to the programming software 56 and allows selection of a "Serial Port" command 318, when choosing to communicate through a serial port directly to a motion control I/O module 54, or selection of a "Network" command 319 for communication on the peer-to-peer network 22' as described herein. There is also an "Exit" command 320 to escape the menu without making either of these first two choices.

Assuming that communication on the network 22' is desired and the "Network" command 319 is selected, a series of data boxes (not shown) will be displayed to request data for the configuration file 57a illustrated in FIG. 2. This file 57a is a file with twenty-one (21) lines storing ASCII characters as more particularly defined in Table 1 below. After any single ASCII character, a comment comprising a series of ASCII characters can be stored following a symbol "//".

TABLE 1

| Line | Definition | Value/Range |
|---|---|---|
| | Configuration File | |
| 1 | File Comment | None |
| 2 | Reserved for future use | None |
| 3 | The programmable controller (PC) type at the destination station. | A = PC Type 1<br>B = PC Type 2 |
| 4 | The type of network interface module used for interfacing the programming terminal to the peer-to-peer network. | A = Type 1<br>B = Type 2<br>C = Type 3<br>D = Type 4 Serial |
| 5 | Device connection. The available ports on a programming terminal are COM 1 and COM 2 for type D operation in line 4. The ATTACHED mode applies to types 1, 2 and 3 in line 4. | A = COM 1<br>B = COM 2<br>C = ATTACHED |
| 6 | Location of driver card in rack. The binary address of type 1, 2 or 3 in line 4. This address can be found in the technical brochures for the device. For type 2, this value must be zero (0). | 10 binary digits |
| 7 | Source station network address. | 00 to 77 octal |
| 8 | Destination station network address | 00 to 77 octal |

TABLE 1-continued

| Line | Definition | Value/Range |
|---|---|---|
| | Configuration File | |
| 9 | Network connection type. This does not apply to type 4 serial communication in line 4. | D = Direct<br>M = Multidrop |
| 10 | Device interrupt address of the line 4, type 1 interface card. | A = IRQ3<br>B = IRQ5<br>C = IRQ10<br>D = IRQ12 |
| 11 | Baud rate for network communication. Depends on type of interface module used. | A = 300<br>B = 600<br>C = 1200<br>D = 2400<br>E = 4800<br>F = 9600<br>G = 19200<br>H = 57600<br>I = 115200<br>J = 230400 |
| 12 | Parity mode of driver for serial network communication only. | A = No Parity<br>B = Even Parity<br>C = Odd Parity |
| 13 | Duplex mode on driver for serial network communication only. | A = Half<br>B = Full |
| 14 | Error checking type for serial network communication only. | A = CRC<br>B = BCC |
| 15 | Network access for line 4, type 2 and type 3 communications only. | A = Local<br>B = Remote |
| 16 | Bridge address for line 4, type 2 and type 3 communications only. | 0 to 376 octal |
| 17 | I/O module rack address. | 0 to 255 decimal |
| 18 | I/O module group address. | 0 to 7 |
| 19 | I/O module high/low byte address. | 0, 1 |
| 20 | The transfer type. With handshaking follows the protocol described earlier. Direct transfers are used to transfer individual blocks. | A = Semi-Handshaking<br>B = Direct |
| 21 | Delay time, for handshake mode only, to wait between write and read block transfers. The value is specified in milliseconds. | 0 to 9999 decimal |

In line 4, the four alternative network interface modules (55 in FIG. 2) are Type 1 (the 1784-KTK1 network interface module), Type 2 (the 1784-KL network interface module), Type 3 (the 1784-KT network interface module), and Type 4, (the Serial KF2 network interface box) offered by the assignee of the present invention.

The configuration file 57a is stored in memory in the programming terminal 10 and examined by the remote download/upload utility 57 described in relation to FIG. 2, to build messages 130 to send across the network as previously described. For example, lines 7 and 8 of the file 57a in Table 1 contain the source network station and destination network station addresses which are loaded in fields 134 and 132 in the network message 130 as will be described in relation to FIG. 13. Lines 17-19 of the file 57a in Table 1 contain the system-mapped I/O address of the motion control I/O module 54, which is loaded in the packet header 136 described in relation to FIG. 13.

Figure 5:
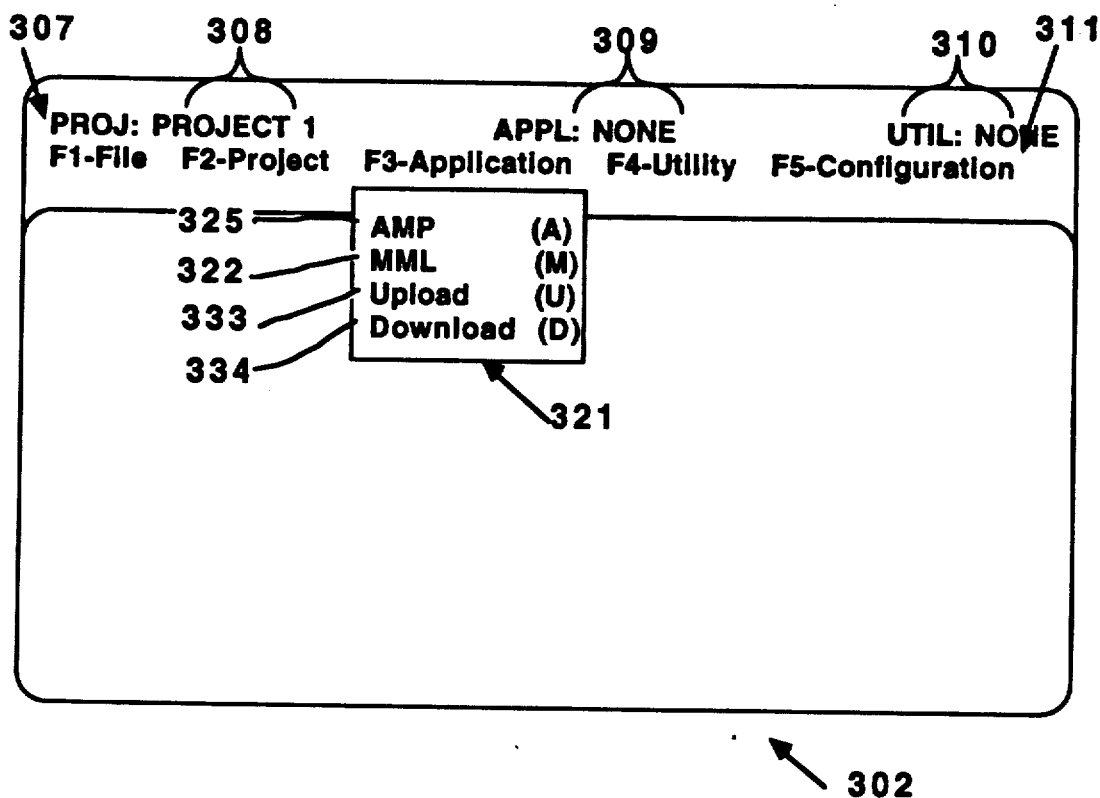
FIGS. 5-9 are screen displays showing operation of the programming terminal seen in FIG. 2 for downloading and uploading files to the motion control I/O module of FIG. 2.

Next, as see in FIG. 5, after a project is opened and the communication parameters have been selected, the user may operate function key F3 to open an "applications" menu 321. This menu 321 has at least four choices including AMP, MML, Upload and Download.

Figure 6:
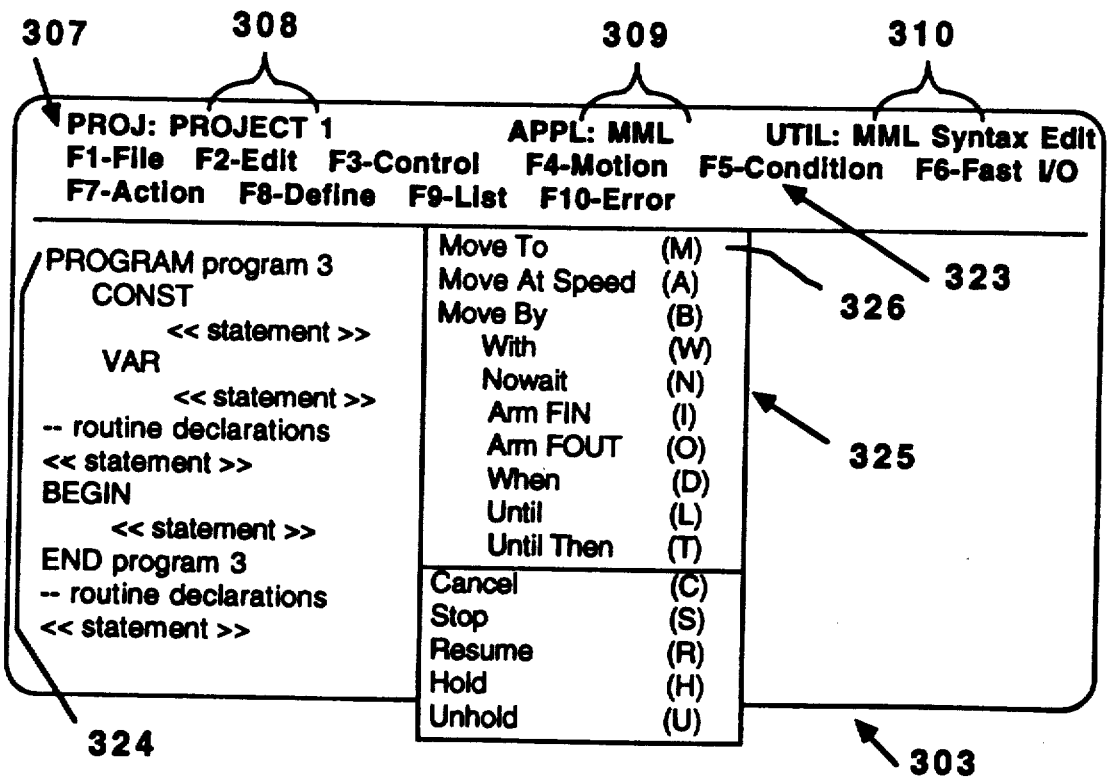

If an MML file is to be created, the MML command 322 is selected in FIG. 5. FIG. 6 shows a window in the MML application, which has the same header 307, but a different menu bar 323 than the screen display for the overall project. Notice the application region 308 now says "MML", and the utility being demonstrated in the MML syntax editor.

As seen in FIG. 6, an MML program 324 has constants (CONST) and variables (VAR) and program control statements (BEGIN, END) and program instructions (<<statements>> following—routine declarations—) which are defined in the Motion Management Language (MML). The Motion Statements menu 325, selected by operating function key F4, is illustrated with choices for entering and defining MML program statements. Selecting the "MOVE TO" command 326 would program a motion statement to move to a next position, or move by a specified increment, or move at a specified speed. This is the type of program information that is collected in an MML file for downloading and execution on the motion control I/O module 54. Before it is downloaded, the program 324 is compiled, or translated, from the motion statements seen on the screen 303 and code that is directly executable on the I/O module 54.

Figure 7:
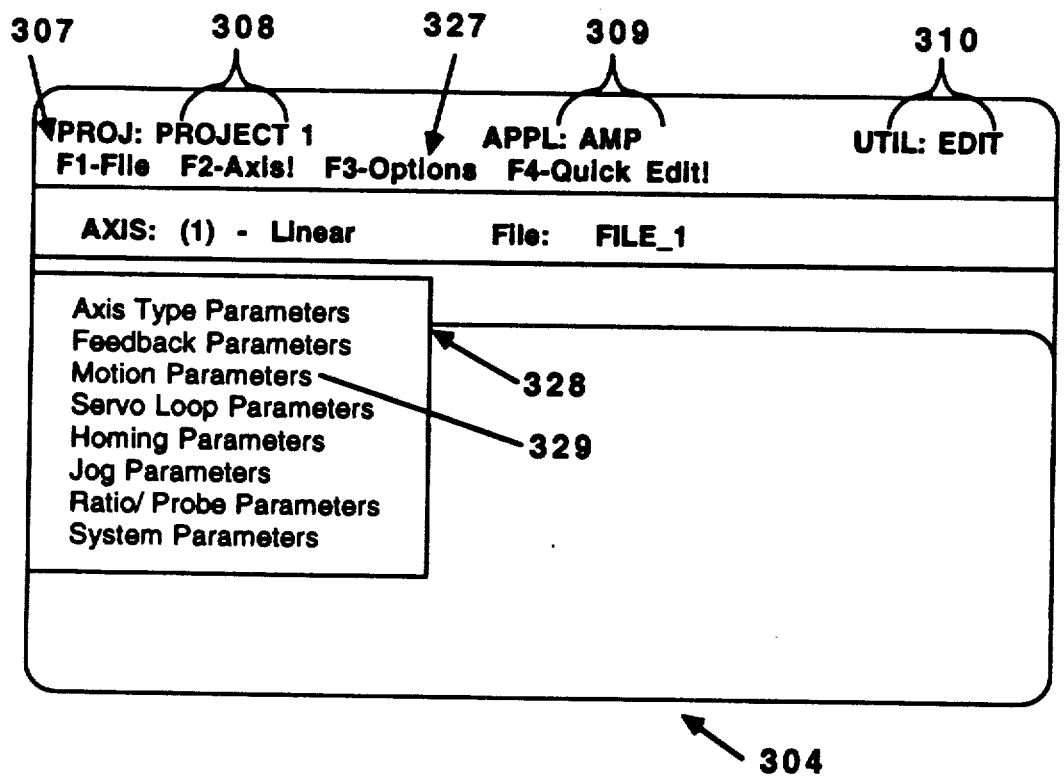

Returning for a moment to FIG. 5, selection of an "AMP" command 325 on menu 321 opens or activates an application and screen display to create or edit an AMP file. FIG. 7 shows an example of operating in the EDIT utility routine within the AMP application. In this application, a menu bar 327 includes choices under the headings FILE, AXIS!, OPTIONS and QUICK EDIT! for choosing one of four respective menus under those headings by operating the appropriate function key F1- F4. As discussed earlier, the AMP data represents adjustable machine parameters that are dependent on the specific equipment being controlled (element 127 in FIG. 1).

In FIG. 7, "(1)—Linear" is the name of the Axis being defined and FILE_1 is the AMP file in which the parameters will be stored and transferred. FIG. 7 also illustrates selection of the Axis! menu 328 by operation of function key F2. This menu 328 includes choices for categories of parameters beginning with "Axis Type Parameters" and ending with "System Parameters".

Figure 8:
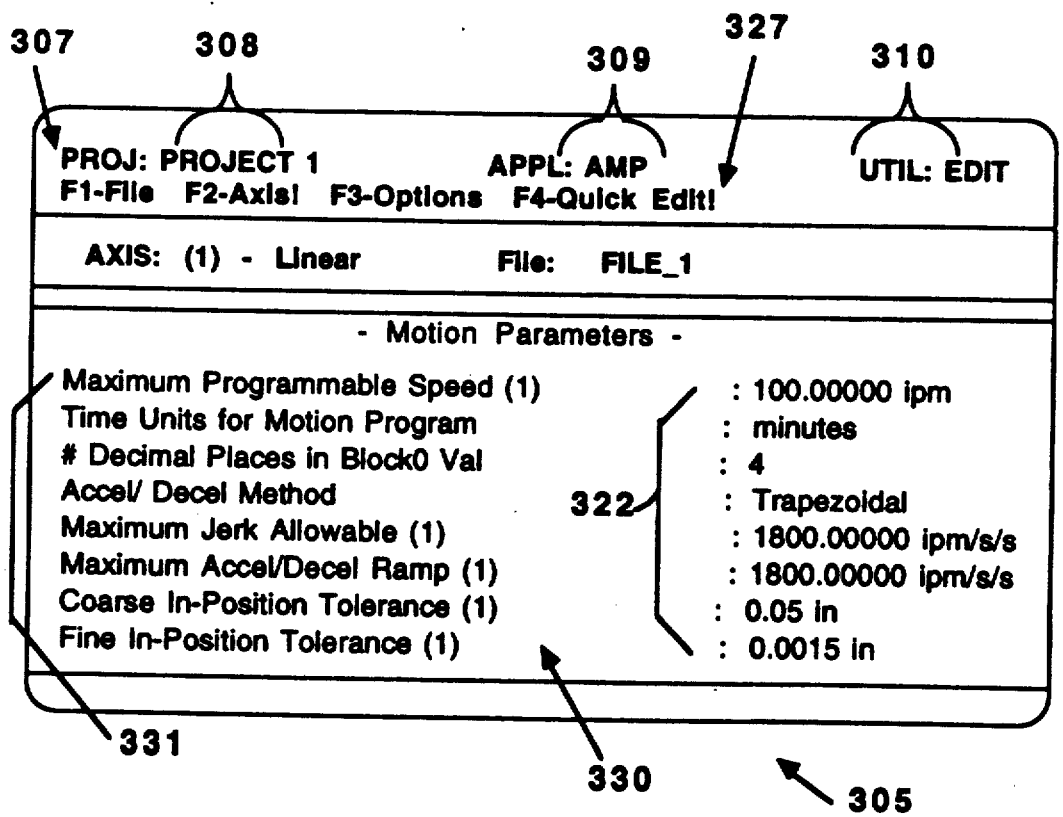

FIG. 8 shows that upon selection of "Motion Parameters" choice 329 from menu 328, a data entry box 330 is opened and displayed on the screen 305. In FIG. 8, the items to the left of the colons are the parameter labels 331, while the items to the right of the colons are the parameter data 332. The parameter data 332 is collected in an AMP file for downloading and operation on the motion control I/O module 54.

Once AMP and MML files have been created and compiled, one of them may be selected for downloading from the programming terminal 10 to the motion control I/O module 54 or for uploading from the motion control I/O module 54 to the programming terminal 10. Returning to FIG. 5, the download application 333 or upload application 334 is then selected from the application menu 321.

Figure 9:
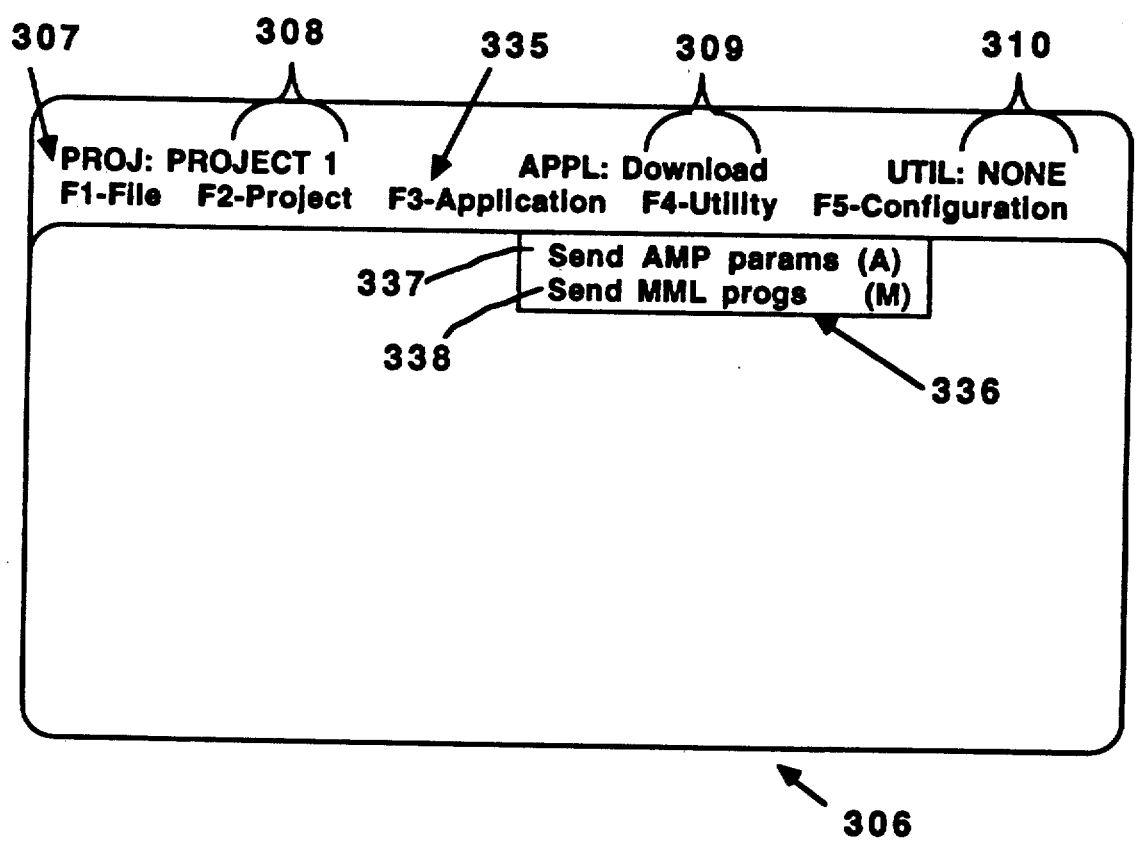

As seen next in FIG. 9, when the DOWNLOAD application has been selected, a screen is shown with a header 307 having the active region 309 labeled "APPL:" showing "Download". In this application 333, a menu bar 335 includes choices under the headings FILE, PROJECT, APPLICATION, UTILITY and CONFIGURATION for choosing one of five respective menus under those headings by operating the appropriate function key F1-F5. When the F4 key is operated, a Utility menu 336 is selected and displayed with a "Send AMP params (A)" command 337 and a "Send MML progs (M)" command 338. When one of these commands 337, 338 is selected, a screen (not shown) appears with the list of files that are available for downloading. When one of these files is selected, and assuming the project has been configured for network communications, the upload/download command is initiated by the programming software 56 through a remote/upload download utility 57.

The remote upload/download utility 57 in FIG. 2 is executed in the form of a command line with the command "apdhintf" and six arguments or parameters, which are named as follows: op_type, fid_type, data_file, conf_file, block_size and +/−. The op_type specifies the type of operation, upload or download. The "fid" is the file identification for the desired operation. It is transparent to the utility 57 but is understood by the target I/O module 54. The data_file is a full path name to an MS-DOS file for sending or receiving the data depending on the direction of transfer. The conf_file is a full path name to an MS-DOS location for the configuration file 57a. The blk_sz is the overall size of the block to be transferred in words and the default value is 63 words. If the file is larger than 63 words, then several commands are sent to transmit several blocks of data as will be explained more below. Finally, the (+/−) argument relates to modes of operation of the screen display during the transfer.

The remote upload and download utility 57 receives the arguments, represented by element 56a, from the programming software 56 and it also receives parameters from the configuration file 57a.

The remote upload/download utility 57 utilizes the parameters, represented by elements 56a and 57a, and passes them to the network driver routines 58 that assemble or disassemble network messages 130 for communication over the network as shall be described below.

D. Description of the Processor Module

Figure 10:
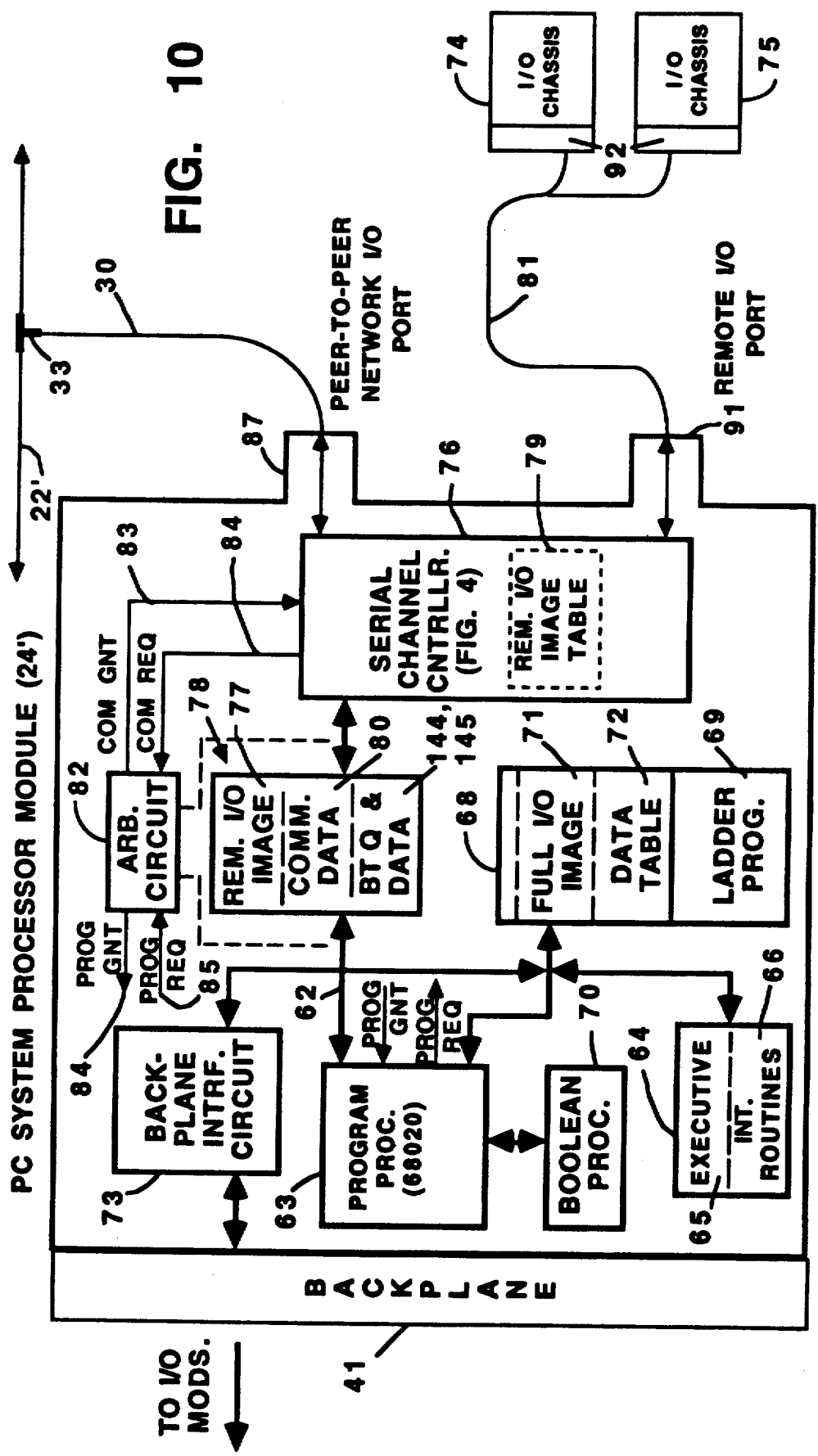
FIG. 10 is a block diagram of the local programmable controller processor seen in FIG. 2.

Before describing the details of the communications over the network to the programmable controller system processor 24', the processor itself will be described. Referring next to FIG. 10, there is shown a block diagram of the processor module 24' for carrying out the invention. The processor module 24' is operated under the direction of a program processor 63, which is a Motorola 68020, and which executes a program of firmware instructions stored in a firmware PROM 64 (programmable read only memory). These include a multitasking executive routine 65 and a group of interrupt routines 66. The program processor 63 is connected to the firmware PROM 64 and other memories and circuitry by address, data and control buses, represented generally by bus connection 62.

The program processor 63 also executes a user's application program 69, and this is stored in a system program memory 68, which is a random access memory (RAM). This user's application program 69 is, for purposes of this example, in the ladder diagram graphical format, although this processor 63, as enabled by its firmware, is capable of executing programs or portions of a user program in machine language or in the sequential function chart language. In executing instructions of the ladder diagram type, the program processor 63 initiates its own interruption by a Boolean processor 70, which is a logic circuit designed for fast execution of bit-oriented instructions, which may make up as much as 70% of a typical ladder diagram program.

In executing the ladder diagram, input status data is examined and output status data is set in a full I/O image table 71 in the system program memory 68. This table 71 is part of a larger data table 72, which also holds certain values used in executing ladder diagram instructions, and which also stores block transfer files and control information.

After each cycle of the program scan, the program processor 63 executes a local I/O scan routine to transmit fresh output status data to discrete I/O modules in its chassis 38 and to receive fresh input status data from discrete I/O modules in its chassis 38. This I/O status data is transferred through the backplane 41 and through a backplane interface circuit 73 comprised of decoding circuitry for decoding programmable controller system-mapped I/O addresses and latches and buffers for coupling the data to and from the backplane 41.

Certain I/O data in the full I/O image table 71 can be exchanged with remote I/O chassis 74, 75. After each cycle of the program scan, the program processor 63 transfers any remote output data in the full I/O image table 71 to a remote I/O image table 77 in a shared memory 78 and reads any fresh input data in the remote I/O image table 77 into the full I/O image table 71 in the system program memory 68. The actual remote I/O scan or exchange is handled by a serial channel controller 76 which communicates with these I/O chassis 74, 75. The serial channel controller 76 maintains another remote I/O image table 79 which is updated as messages are sent and received from the remote I/O chassis 74/75.

The program processor 63 also communicates block transfer files and control information to and from a BT queue and data area 145, 146 in the shared memory 78. Other data which is received and transmitted in messages is stored in a communication data area 80 for processing by the program processor 63.

The serial channel controller 76 and the program processor 63 alternate access to the shared memory 78 with the assistance of an arbitration circuit 82. The serial channel controller 76, and specifically a communication processor 93, gains access to the shared memory by generating a request signal on the communication request (COM REQ) line 83, receiving a return signal on the communication grant (COM GNT) line 84 as its buses to the memory 78 become enabled. Similarly, the program processor 63 gains access to the shared memory 78 by generating a request signal on the program processor request (PROG REQ) line 85, and receiving a return signal on the program processor grant (PROG GNT) line as its buses to the memory 78 become enabled. When the program processor 63 has access, the request line (COM REQ) from the other processor 93 is disabled by the grant signal (PROG GNT) to the processor 63 with access. When the program processor 63 gives up access, it removes the request (PROG REQ) signal, and a short time later the grant (PROG GNT) signal is removed, which enables the request line (COMM REQ) from the other processor 93. With this arbitration circuit, the processors 63, 93 can alternate access to the shared memory 78.

The serial channel controller 76 is connected through one of two communication channels to the peer-to-peer network 22' through a peer-to-peer port 87 represented by the connector 27' in FIG. 2. The drop line 30 connects to a T-connector 33 on the peer-to-peer network 22' as also shown in FIG. 2. The serial channel controller 76 is connected through a second of two communication channels to the remote I/O link 81 through a second port 91 (not shown in FIG. 2). The remote I/O link 81 then connects to I/O communication adapter modules 92 which interface I/O modules in remote chassis 74, 75 to the processor module 24' as seen in FIG. 10.

Figure 11:
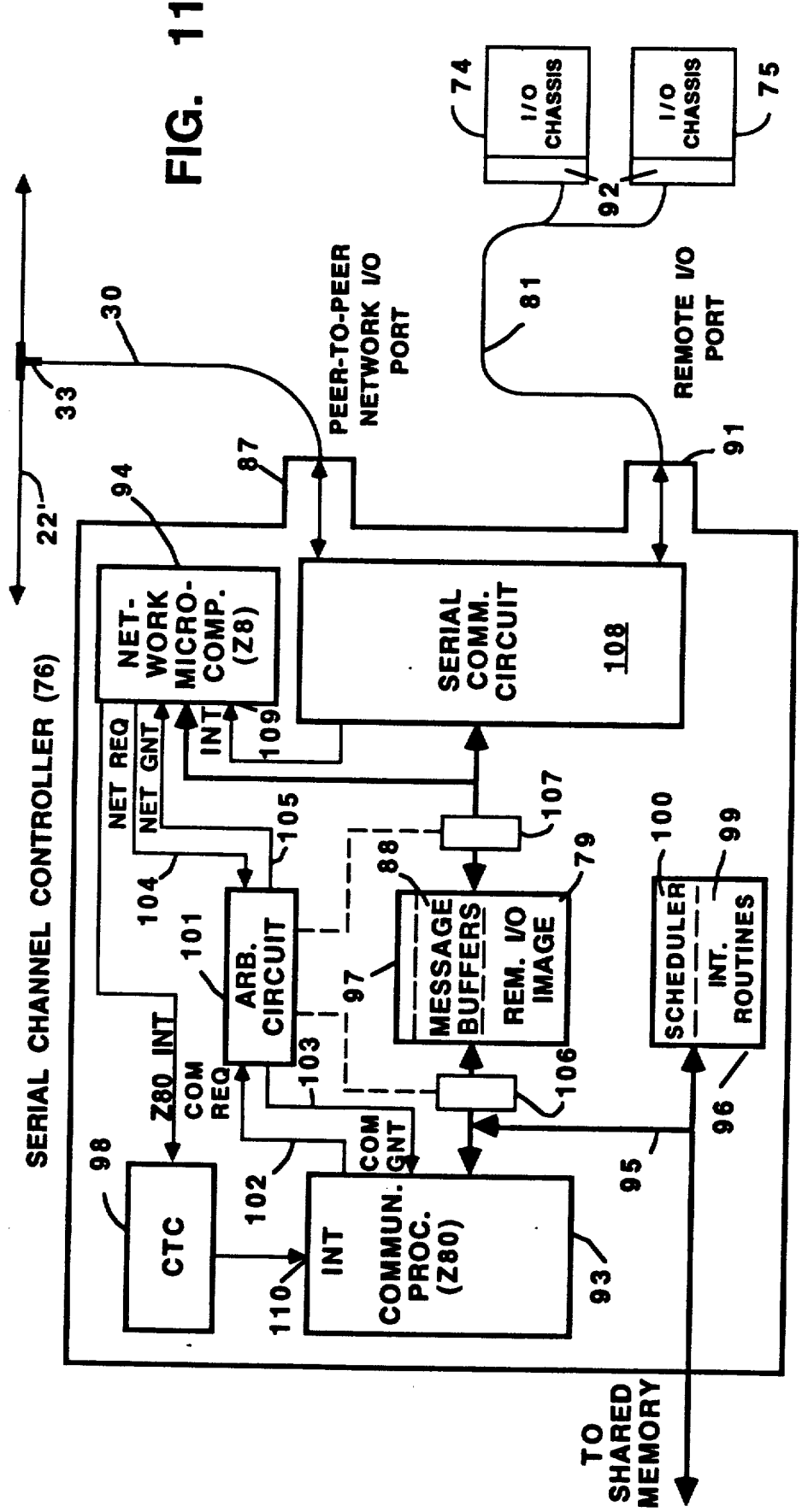
FIG. 11 is a block diagram of the serial channel controller of FIG. 10.

FIG. 11 shows that the serial channel controller 76 includes additional microelectronic processors, including a communication microprocessor 93, preferably, the well known Zilog Z80A microprocessor, and a network microcomputer 94 which is the Zilog Z8 microcomputer with on-board RAM and PROM. The communication microprocessor 93 operates to handle higher-level application functions, while the network microcomputer 94 is concentrated on handling network-level operations over the peer-to-peer network 22'. The communication microprocessor 93 is connected by address, data and control buses, represented generally by element 95, to the shared memory 78 in FIG. 3, to a firmware PROM 96 and to a communication random access memory (RAM) 97 which is shared with the network microcomputer 89. The communications RAM 97 stores the remote I/O image table 79 referred to earlier, as well as message buffers 88 for data in messages communicated over the network 22'.

A counter/timer circuit (CTC) 98 designed for operation with the Z80A microprocessor generates interrupt signals to an interrupt (INT) input 110 on the communication microprocessor 93, sometimes in response to signals on a Z80 INT line from the network microcomputer 94. This causes the communication microprocessor 93 to "vector" to execute one of the interrupt routines 99 stored in the firmware PROM 96. Before and after interrupts, the communication microprocessor 93 executes a scheduler routine 100 which indicates certain tasks are in need of execution either before, during or after the interrupt routines 99.

The communication microprocessor 93 and the network microcomputer 94 alternate access to the communication memory 97 with the assistance of an arbitration circuit 101. The communications microprocessor is connected to the arbitration circuit 101 through a communication request (COM REQ) line 102 and a communication grant (COM GNT) line 103. The network microcomputer 94 is connected to the arbitration circuit through the network request (NET REQ) line 104 and network grant (NET GNT) line 105. The arbitration circuit 101 responds to these signals as described for the first arbitration circuit 82 described in relation to FIG. 10. In FIG. 11 it can be seen the arbitration circuit activates and deactivate buses leading to communication RAM 97 by enabling and disabling buffers 106, 107. In this way the communicating processor and the network microcomputer 94 alternate access to the communication RAM 97.

A serial communication circuit 108 converts between the serial data transmitted and received on the networks and the parallel data used generally in the processor module 24'. Whenever a character (equal to a byte of data) is transmitted or received, the serial communication circuit 108 generates an interrupt signal to an INT input on the network microcomputer 94, which then executes an interrupt routine to read the next byte of data from the serial communication circuit 108 or to transmit the next byte of data to the serial communication circuit 108. The serial communication circuit is preferably a Zilog Z8030 serial input/output controller, which is designed for application with the other Zilog circuits mentioned herein.

E. Description of the Motion Control I/O Module

Figure 12:
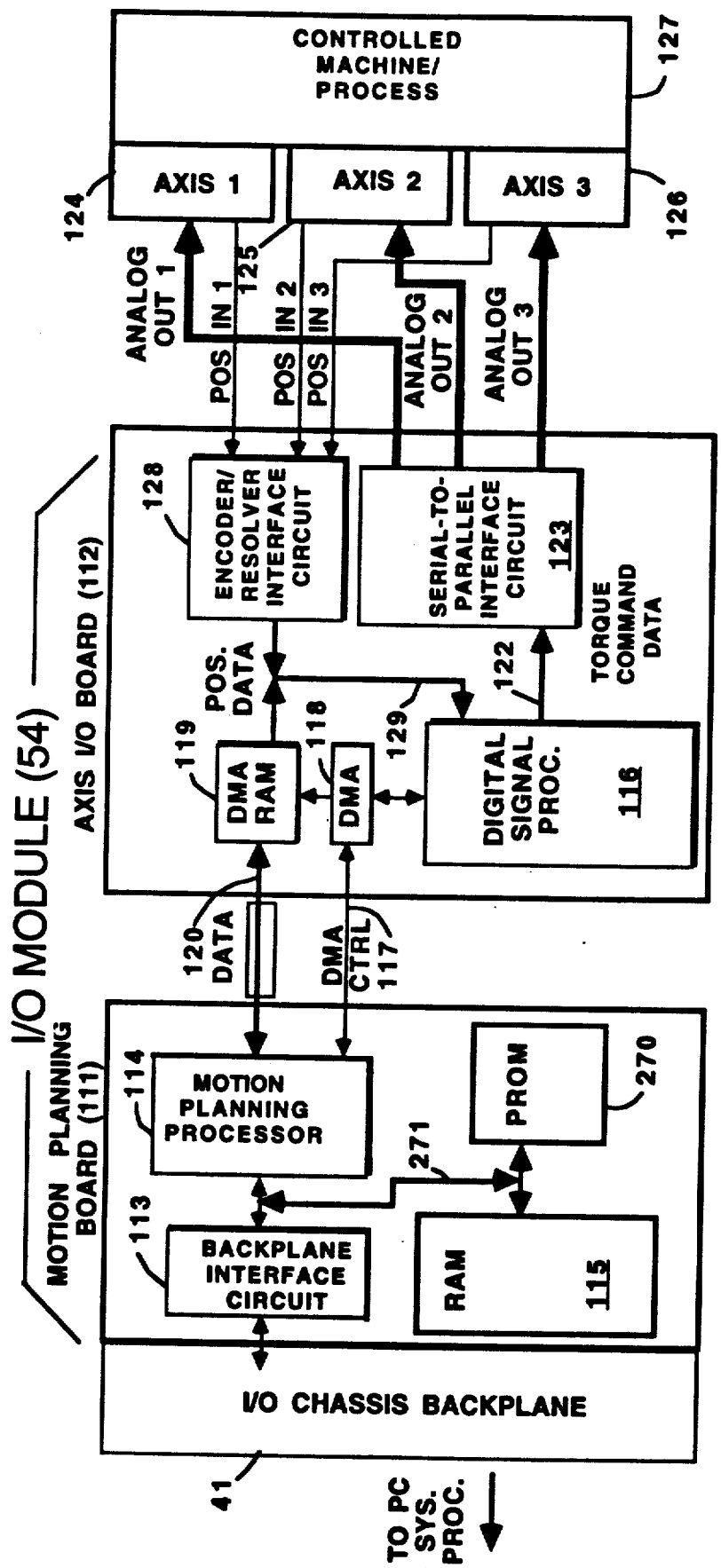
FIG. 12 is a block diagram of the motion control I/O module seen in FIG. 2.

Referring to FIG. 12, the motion control I/O module 54 includes a motion planning circuit board 111 and an axis I/O circuit board 112. The motion planning circuit board 111 includes a backplane interface circuit 113 which interfaces control signals and handles system I/O data sent between the I/O module 54 and the programmable controller system processor 24'. This circuit 113 passes the system I/O data to a motion planning processor 114, which in this embodiment is a Model 68000 microelectronic CPU offered by Motorola Semiconductor Products, Austin, Tex. The backplane interface circuit 113 includes two 74ACT651 octal flip-flops available from Texas Instruments, Inc., for transfer of two bytes of discrete I/O data between the I/O module 54 and the PC system processor 24'. Discrete I/O data is bit-oriented programmable controller I/O data assembled in one or more bytes for communication to or from an I/O module. In addition, the backplane interface circuit 113 includes a custom-designed integrated circuit known as the TIC chip, (seen in FIG. 24) which is disclosed in Makovyak et al., U.S. patent application Ser. No. 249,415 filed Sep. 23, 1988. This chip allows transfer of a third byte of discrete I/O data, as well as handling block transfer data.

The motion planning processor 114 stores and processes motion control program information in an associated RAM memory 115 on the motion planning board 111 and passes motion commands to a digital signal processor (DSP) 116 on the axis I/O board 112. The DSP 116 is preferably a TMS-320C25 circuit offered by Texas Instruments, Inc., Dallas, Tex. This microelectronic processor offers high speed processing for servo control loop functions. The two processors 114, 116 exchange system I/O data using a direct memory access (DMA) technique. The processors 114, 116 send control signals through DMA control lines 117 to a DMA control circuit 118 to gain access to a DMA random access memory (RAM) 119, where data is deposited and retrieved by the respective processors 114, 116. Each processor 114, 116 is connected to the DMA RAM 119 by a respective DMA data bus 120, 129 for this purpose.

The DMA bus 120 that connects the motion planning circuit board 111 and the axis I/O circuit board 112 runs through a secondary bus on the equipment chassis backplane 41. Other signals, such as address and control signals which are communicated between the two boards 111, 112 are transmitted through a flexible ribbon connector which plugs into connectors on the respective boards 111, 112.

The DSP 116 is connected by a serial data bus 122 to a serial-to-parallel interface circuit 123, which is more particularly described in a copending application of J. Pepera et al. entitled, "Isolation Interface for a Controller I/O Module" and filed on Sep. 11, 1990. The serial-to-parallel interface circuit 123 is connected to respective servo I/O device 124, 125, 126 for the three axes of motion (AXIS 1, AXIS 2, AXIS 3) on a controlled machine or process 127. This circuit extracts I/O data for each I/O device 124, 125, 126, converts the data to an analog output signal, and then transmits the analog output signal through ANALOG OUTPUTS 1-3 to the respective I/O devices 124, 125, 126.

Each servo I/O device 124, 125, 126 also includes a resolver or encoder for generating signals which correspond to the position of an output shaft on the servo motor. These signals are received by the servo I/O board 112 through the POS IN 1-3 lines seen in FIG. 5. These signals are received by an encoder/resolver interface circuit 128 which includes signal conditioning circuitry, an optical isolation interface circuits and an encoder/resolver signal processing circuit as more particularly described in Dummermuth et al., U.S. Pat. No. 4,831,510, issued May 16, 1989. This circuit 128 transmits position data through a parallel data bus 129 to the DSP 116.

F. Communication of Motion Program Information through the Network

Figure 13:
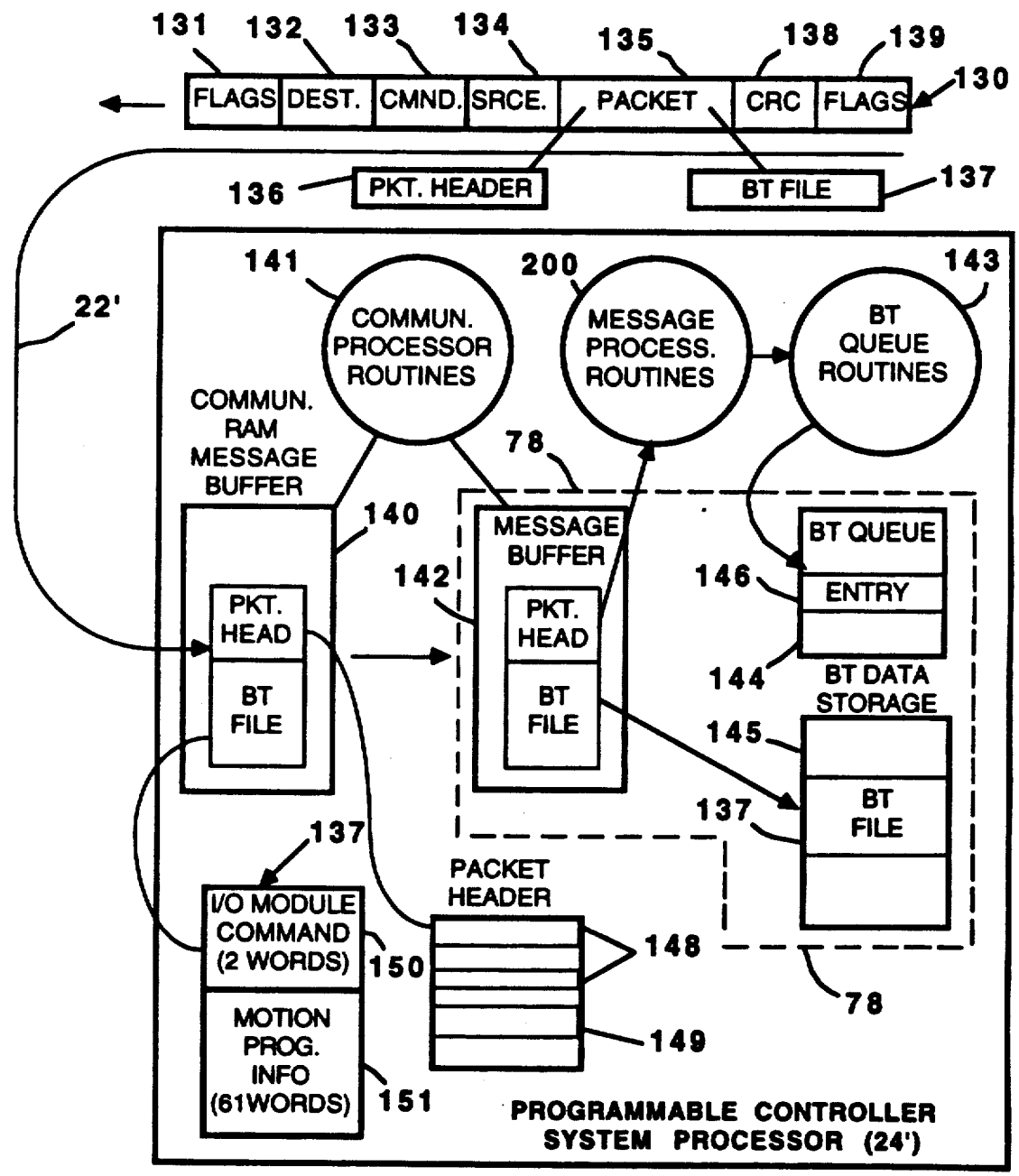
FIG. 13 is a data flow diagram for the programmable controller local system processor of FIG. 2.

FIG. 13 shows how an MML file is downloaded into the programmable controller system processor 24'. Data is uploaded and downloaded through messages 130 which are transmitted on the network 22'. These messages 130 have a frame of data with specified fields. Such a definition of message frames for all messages on the network is sometimes referred to as a network protocol. Each control or command field generally includes at least one byte of data, while data fields may include many bytes of data.

The message 130 shown in FIG. 13 is a DOWNLOAD MML command message. Other messages 130 that will be discussed are a DOWNLOAD MML reply message 130 sent from the PC system processor 24' to the programming terminal 10, an UPLOAD MML command message 130 sent from the programming terminal 10 to the PC system processor 24' and an UPLOAD MML reply message 130 sent from the PC system processor 24' to the programming terminal 10.

The first field in the message frame is an opening flags field 131, which is data recognized by hardware in identifying the beginning of a message. The second field is the address of the network destination station field 132. The third field is a command/reply number field 133 identifying the type of network message being sent. The fourth field is a network source station address field 134.

The fifth field is the message data field or data packet 135. In this case the data field 135 contains programmable controller system I/O data, referred to as the "BT file" 137, and control information referred to as the packet header 136. The packet header information 136 is used by the network destination station to set up further communication with the motion control I/O module 54.

The data packet 135 is followed by a CRC field 138, the CRC meaning "cyclic redundancy code" which is an error code used for checking the validity of the information received over the network 22'. Finally, the last field is the closing flags field 139 which is data recognized by hardware in identifying the end of a message 130.

When the DOWNLOAD MML command message 130 is received by the PC system processor 24', it is received in a message buffer 140 in the communication memory 97. From there it is transferred through execution of communication processor routines 141 to a message buffer 142 in the shared memory 78, which is accessible by the program processor 63. The program processor 63 executes communication routines 200 to first unpack the packet header 136 and the BT file 137 from the message data. It then calls a group of block transfer processing routines 143 to examine the command and control information in the packet header 136.

The packet header 136 includes a network UPLOAD or DOWNLOAD command 148 and an I/O address 149 which is the system-mapped I/O address of the motion control I/O module 54 in the programmable controller system controlled by processor 24'.

Based on examining that control information, the program processor 63 loads an entry 146 into a block transfer queue area 144 of the shared memory 78. The entry 146 will be examined in more detail below. The block transfer data file 137 is transferred from the message buffer 142 to a BT data storage area 145 in the shared memory 78.

The transfer of the block transfer data file 137 to or from an I/O module is carried out by the communication processor 93 In FIG. 11 when it has access to the shared memory 78 in FIG. 10. The communication processor 93 examines an active block transfer queue area for local transfers to find the entry 146 and then executes the block transfer with the I/O module 54. The communication processor 93 will read or write the BT file 137 to or from the BT storage area 145 according to the direction of transfer.

The block transfer data file 137 includes two words of I/O module commands 150 seen in FIG. 13 which are passed through the processor module 24' for interpretation by the motion control I/O module 54. Following these two words are sixty-one words of motion programming information 151 in the case of a download operation. The block transfer data file 137 is a predetermined and fixed size of sixty-three (63) words when it is being transferred between the programming terminal 10 and motion control I/O module 54.

G. Organization of the Data Packet in Network Messages

Figure 14:
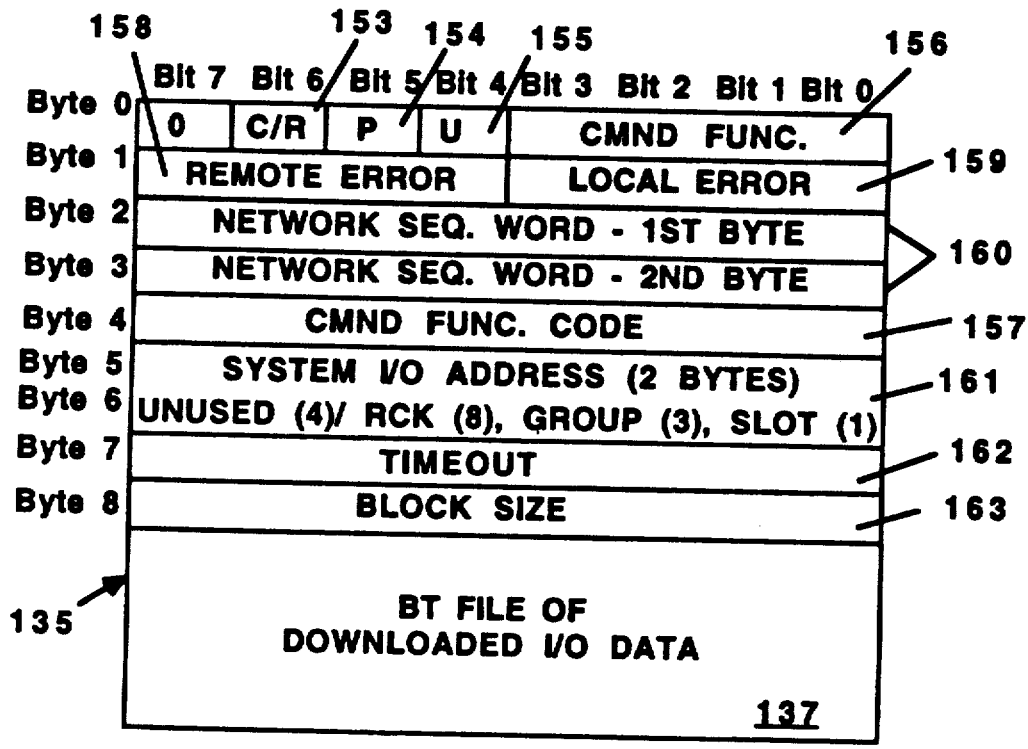
FIGS. 14-15 are maps of packets of the type seen in FIG. 13.

Referring to FIG. 14, a map of the data packet 135 for a DOWNLOAD command message 130 is seen in more detail and includes Bytes 0-8 in the packet header 136 as well as the 63-word block transfer data file 137. In Byte 0, bit 7 is "0", bit 6 is a command/reply bit 153, bit 5 is a priority bit 154 and bit 4 is an unused bit 155. Bits 0-3 contain part of the command function code 156, while a second part 157 is found in Byte 4. For a download command, the function code is "0F" (hex, Byte 0), "6B" (hex, Byte 4).

In Byte 1, the upper four bits are a remote error code 158 and the lower four bits are a local error code 159. Bytes 2 and 3 are bytes in a network sequence word 160, the function of which relates to the token passing network 22', as further explained in Roach et al., U.S. Pat. No. 4,747,100, issued May 24, 1988 and Merrill et al., U.S. Pat. No. 4,942,552, issued Jul. 17, 1990, cited earlier.

Bytes 5 and 6 are bytes contain the PC system-mapped I/O address 161 of the motion control I/O module 54 in which the upper four bits are not used, the next eight bits are the programmable controller rack or chassis number from "0-37" (octal), the next three bits are the I/O module group number from "0-7" (octal) and the lowest bit signifies a high byte/low byte slot within the module group.

Byte 7 is a timeout value 162, and when this occurs, a communication error is declared. Byte 8 is a block size value 163, in this case "63" (decimal) in binary format.

Figure 15:
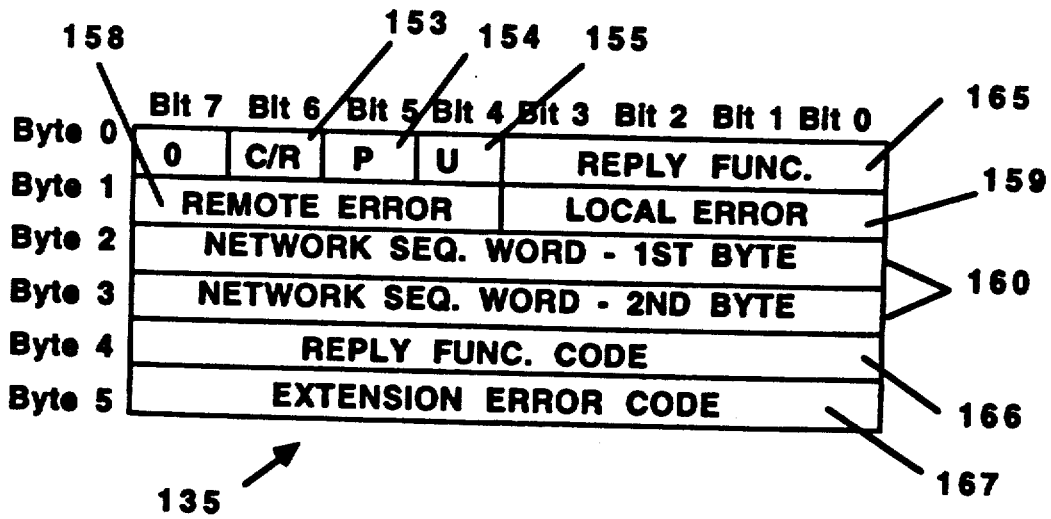

FIG. 15 shows a map of the data packet 135 for a DOWNLOAD reply message, which is similar in format to the DOWNLOAD command message 130, except that bit 6 of Byte 0 is set to the reply state and bits 0-3 in Byte 0 and bits 0-7 in Byte 4 are reply function codes 165, 166, since this is a reply message 130. Byte 5 is an extension error code 167 for the remote error code 158 in Byte 1. Any data after Byte 5 is ignored.

Figure 16:
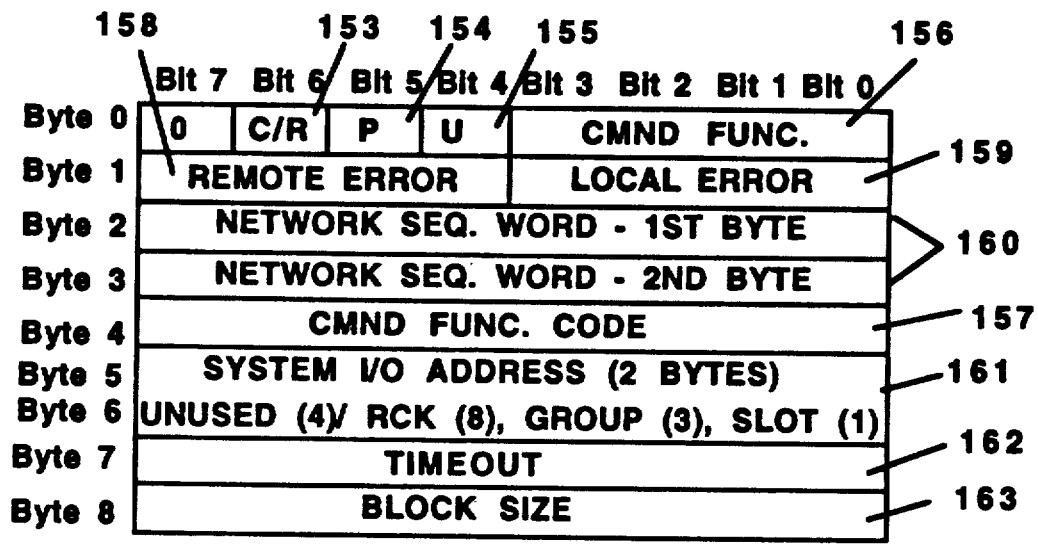
FIGS. 16-17 are maps of the packets of the type seen in FIG. 13.

FIG. 16 shows a map of the data packet 135 for an UPLOAD command message. The description for the DOWNLOAD command message applies, except that the command function code 156, 157 is "0F" (hex, Byte 0), "6C" (hex, Byte 4), and the block transfer data file 137 is not found in the command packet 135 in FIG. 16, but is found in a reply packet 135 shown in FIG. 17.

Figure 17:
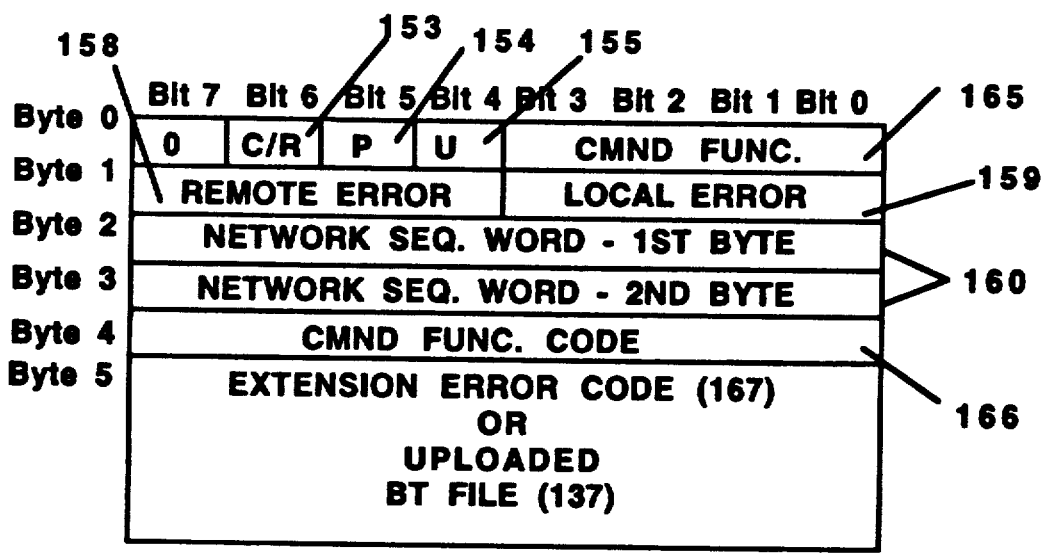

As shown in FIG. 17, a map of the data packet 135 for an UPLOAD reply message has the same definition for Byte 0 as the data packet 135 for the UPLOAD command message, except that bit 6 of Byte 0 is set to the reply state and bits 0-3 in Byte 0 and bits 0-7 in Byte 4 are reply function codes 165, 166, since this is a reply message. Bytes 5 and higher may be an extension of the remote error code 167, when an error occurs, or Bytes 5 and higher may include a 63-word uploaded block transfer data file 137.

Figure 18:
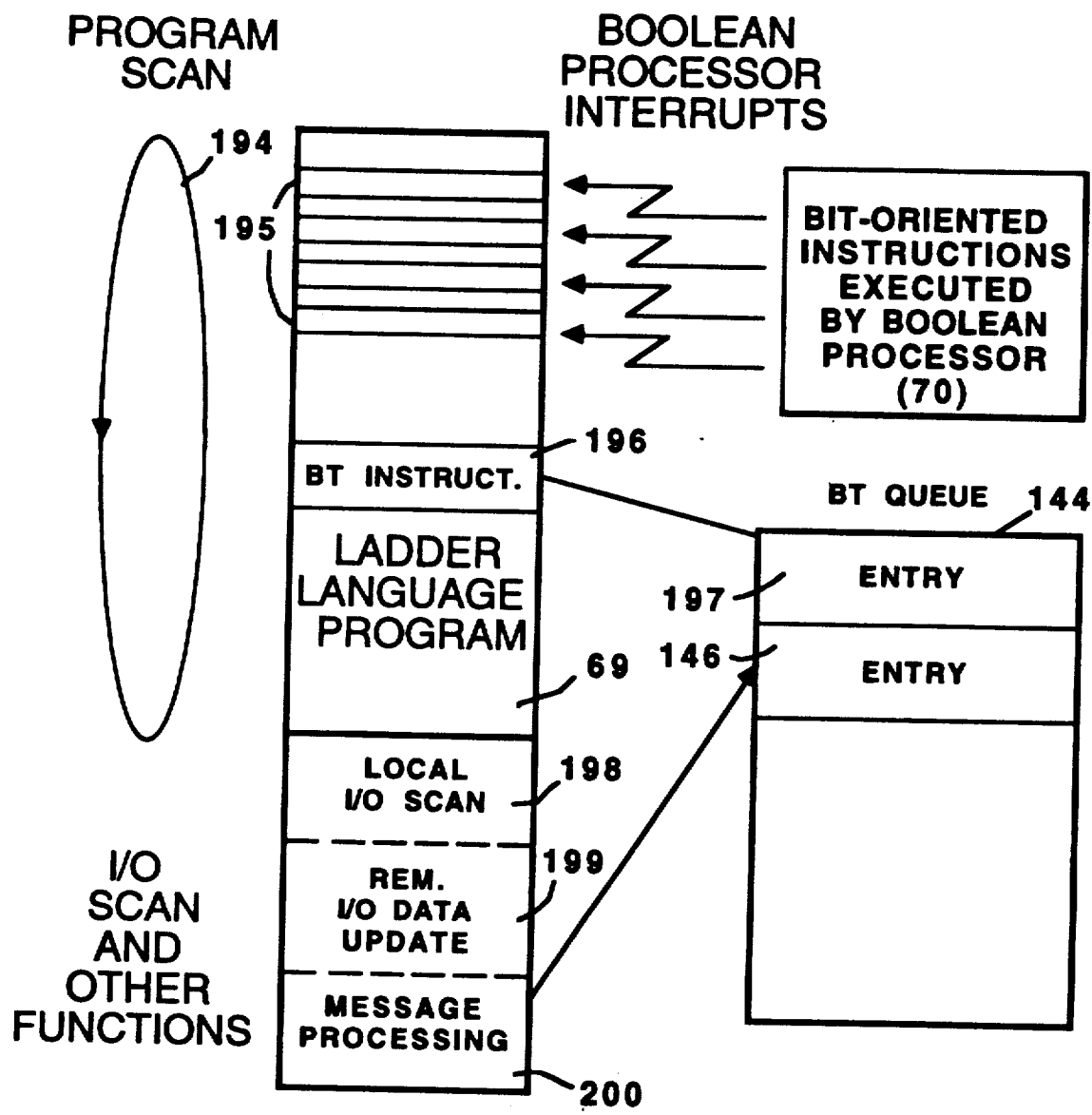
FIG. 18 is a diagram of the operation of the program processor of FIG. 10 according to a stored program.

H. Setting up Block Transfers on the Processor Module in response to Network Messages FIG. 18 shows the operation of the program processor 63. During a "program scan" represented by loop 194, the program processor 63 cycles through execution of the user's application program 69, which is typically written in the ladder-diagram programming language and then loaded into the system memory for execution. The ladder-diagram language is well known with its bit-oriented instructions represented by mnemonics XIC, XIO, OTE, OTL and OTU, as well as communication instructions such as GET and PUT and block transfer instructions.

The program processor 63 allows its own interruption by a hardware-based Boolean processor 70 for fast execution of bit-oriented instructions 195 in the user application program 69. In this example, the ladder language program 69 also includes block transfer instructions 196 to move a file of I/O data between the BT storage area 145 (see FIG. 13) and the motion control I/O module 54 in the direction specified by the UPLOAD or DOWNLOAD command.

Besides the block transfers commanded by the programming terminal 10, other types of block transfer communications are typically carried out with modules such as the motion control I/O module 54. The ladder language program 69 typically includes an instruction 196 to transfer a 22-word block of commands and program data to the motion control I/O module 54 for use and reference in executing the motion control program on the I/O module 54. When the instruction 196 is encountered during execution of the user application program 69, the program processor 63 executes firmware instructions to generate an entry 197 in a block transfer (BT) queue area 144 (See FIG. 13).

Figure 19:
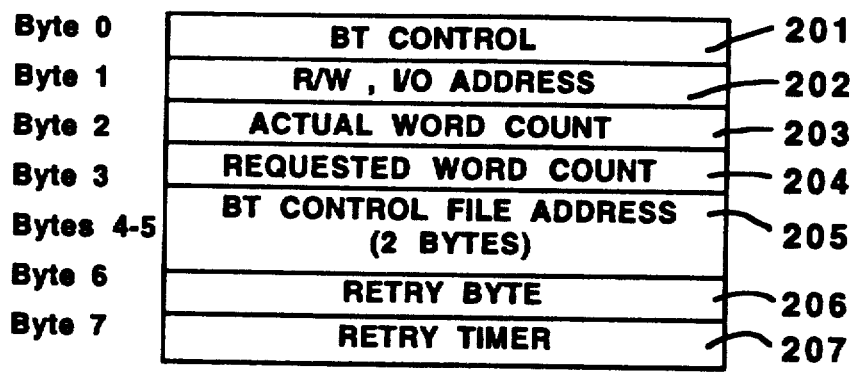
FIG. 19 is a diagram of an entry loaded into a block transfer queue area in memory according to the operation of FIG. 18.

Each entry 197 in the BT queue area 144 includes eight bytes of data seen in FIG. 19. The first of these is a BT control byte 201 with control bits defined as follows:

TABLE 2

| Bit | Symbol | Description |
|---|---|---|
| 7 | EN | Set by program processor to load active queue and request block transfer. |
| 6 | RQ | Set by communication processor when block transfer has been initiated with I/O module. |

TABLE 2-continued

| Bit | Symbol | Description |
|---|---|---|
| 5 | DN | Set by communication processor when block transfer has been completed with I/O module. |
| 4 | ER | Set by communication processor when error occurs during block transfer. |
| 3 | CO | Continuous bit set from command in ladder language program. |
| 2 | EW | When set this means that communication instruction in ladder program has been accepted by BT processing routines in program processor. |
| 1 | NR | No response or not ready status of I/O module. |
| 0 | MCB | Set by communication processor to signal Module Control Byte sent to I/O module. |

As seen in FIG. 19, the next Byte 202 includes the read/write (R/W) direction bit as bit 7 and the remaining bits contain the system-mapped I/O address of the target I/O module 54 with three bits for the chassis address, three bits for the module group number and one bit for high/low byte slot address. The number of words actually transferred in the block transfer mode is stored in Byte 203. The word count requested for transfer is stored in Byte 204. A data table address for the block transfer control file is stored in Bytes 205 and 206. Byte 207 is a retry flags and Byte 208 is a retry timer byte.

FIG. 18 shows a pending queue area 144 for local block transfers to the motion control I/O module 54 within the same I/O chassis 20. Entries in the pending queue 144 are transferred to an active queue through execution of the block transfer queue routines 143 represented in FIG. 13. There is a pending queue and an active queue for local block transfers and there is a pending queue and active queue for remote block transfers to I/O modules in the remote I/O chassis 74, 75 in FIG. 11. For local block transfers, the number of entries allowed in the active queue is one for each logical rack. A double density I/O chassis of the type for handling the I/O module 54 may include up to two logical racks of I/O addresses for a 16-slot chassis. For block transfers through remote I/O data link 81 in FIGS. 10 and 11 to remote I/O chassis, the active queue has space for two entries for each logical I/O rack.

As seen in FIG. 18, the program processor 24' responds to messages over the network 22' to generate further entries 146 in the pending block transfer queue 144, and the active queue (not shown) so that the BT data files 137 transferred over the network 22' will be transferred as a block to or from the motion control I/O module 54. These entries 146 seen in FIG. 18 and the entries 197 from execution of the user application program 69 both include the information seen in FIG. 19.

The network-responsive BT queue entries 146 are generated during execution of the message processing routines 200 seen in FIG. 18, which includes elements 200 and 143 seen in FIG. 13. As seen in FIG. 18, this message processing takes place after execution of the user application program 69 and is scheduled for 10% or less of total processor execution time.

The invention further provides for continued operation of remote upload and download block transfers when the programmable controller system processor is switched from the RUN mode to the PROGRAM mode for loading of ladder language programs. Normally, block transfers to and from I/O modules have been suspended during programming of the programmable controller system processor (PROGRAM mode). Queue entries 197 resulting from ladder program instructions become inactive when the programmable controller system processor is switched from the RUN mode to the PROGRAM mode.

Therefore, included in the block transfer processing routines 143 in FIG. 13 is a routine that is executed when transition is made from the RUN mode to the PROGRAM mode to clear entries 197 from the queues and leave only the entries 146 resulting from network commands. This prevents UPLOAD or DOWNLOAD commands for MML and AMP files from becoming trapped behind inactive block transfer requests 197.

In the RUN mode, and after execution of the user application program 69, the program processor 63 executes firmware instructions, represented by block 198 in FIG. 18, to perform a local I/O scan in which bytes of discrete I/O data are exchanged between the full I/O image table 71 in FIG. 3 and I/O modules 47 in the same chassis 20 (see FIG. 2).

During the local I/O scan, an I/O address must be decoded and the I/O module activated to receive each byte of discrete I/O data. During block transfer, on the other hand, the I/O module 54 is addressed at an individual I/O address, and need not be repeatedly addressed during transfer of a sequence of data bytes.

The program processor 63 also executes firmware instructions, represented by block 199 in FIG. 18, to update discrete I/O data in the remote I/O image table 77 in FIG. 3. This data is exchanged between the system memory 68 and the shared memory 78 as described earlier. The communication processor 93 in FIG. 4 accesses this data in the shared memory 78 and then sends and receives messages incorporating the remote I/O data to and from the remote I/O chassis 74, 75 seen in FIGS. 3 and 4. The communication processor 93 also performs block transfers of I/O data, through the backplane 41 as well as through the remote I/O data link 81.

Figure 20:
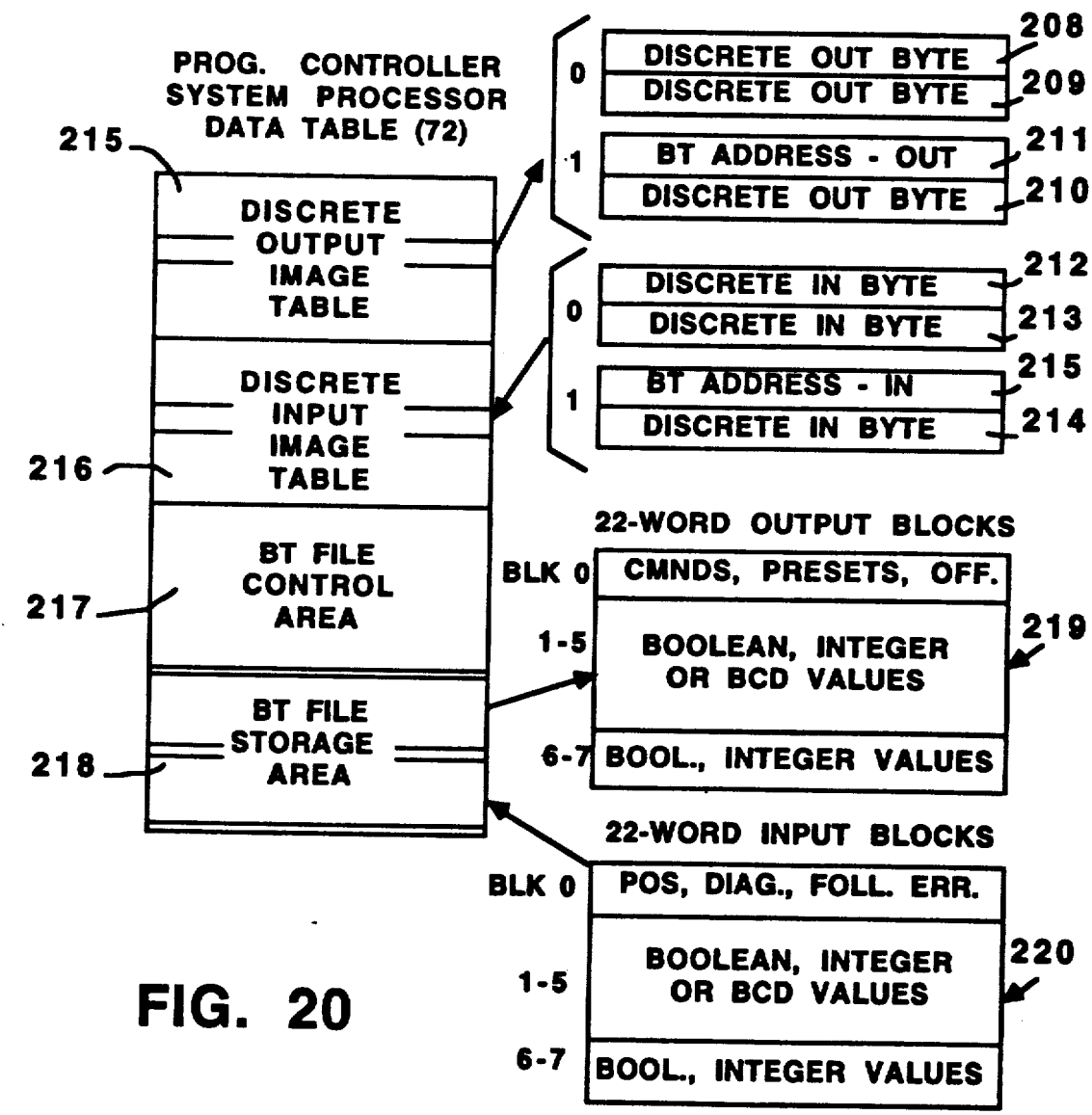
FIG. 20 is a map of the 22-word blocks of data which are transferred between the programmable controller local system processor and the motion control I/O module.

Referring to FIG. 20, further details are shown concerning the communication of block transfer I/O data and discrete I/O data between the programmable controller processor 24' and motion control I/O module 54 of the invention. The motion control I/O module 54 is a double-density I/O module, which means that the module can be addressed at two system-mapped I/O addresses for each slot which it occupies. In this example, the module 54 occupies slots for the "0" and "1" module groups in a logical rack.

As seen in FIG. 20, three bytes of discrete output data 208-210 are transferred from the discrete output image table 215 to the motion control I/O module 54 during the local I/O scan. If a block transfer instruction is executed, it is assigned an I/O address 211 of the low byte of module group 1 to output a file of data to that address. Three bytes of discrete input status data 212, 213, 214 can also be transferred to areas in the discrete input image table 216 for module groups "0" and "1", and a block transfer input instruction can be executed to input a file of data from an I/O address 215 of the low byte of module group 1.

Assuming the block transfers are initiated from an instruction in the ladder diagram program 69, the block transfers are executed with reference to control information in a BT file control area 217 in the data table 72. This control information contains control bits to signal request and completion of the block transfers. The BT instruction in the ladder program contains an address for the storage area 218 in the system processor data table 72 where the BT file is stored as well as the I/O address of the target I/O module 54.

FIG. 20 illustrates the 22-word blocks of I/O data 219, that are transferred as a result of executing instructions in the user application program. These include 22-word blocks of output data 219 and 22-word blocks of input data 220. The blocks of output data 219 include, motion commands, presets and offsets in Block 0, user-defined Boolean, integer or BCD values in Blocks 1-5, user-defined Boolean, integer or BCD values from execution of the user application program in Blocks 6 and 7. The blocks of input data 220 includes status bits for position, diagnostics and following error in Block 0, user-defined Boolean, integer or BCD values in Blocks 1-5, and user-defined Boolean and integer values for examination by the user application program in Blocks 6 and 7. The I/O data in these 22-word blocks 219, 220 links the operation of the user application program 69 executed by the PC system processor 24' and the motion control program which is executed on the motion control module 54.

I. Semi-Handshaking Method for Transferring Motion Program Information Files

Referring to FIG. 2, motion program information files in the programming terminal 10 may be larger than the 61-word size allowed for the data packet 135 in any given network message 130. Such files are uploaded and downloaded through a series of messages using a semi-handshaking method illustrated in FIGS. 21 and 22.

Figure 21:
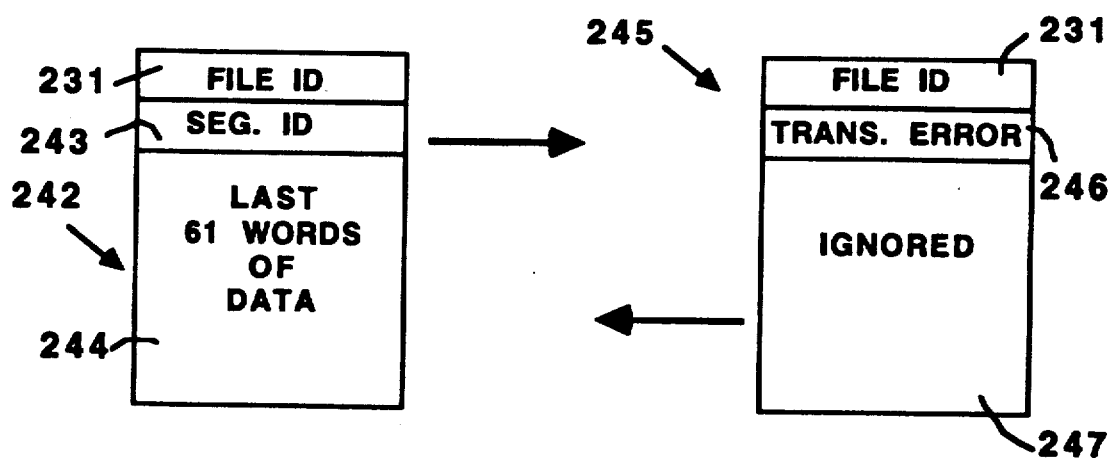
FIG. 21 is a map of blocks of data illustrating a semi-handshake protocol for the download operation.

For example, in the case of "downloading" a 183-word MML file, a first BT file 137 or "signature block" 230 of 63 words seen in FIG. 21 is included in the data packet 135 of a first message 130 sent from the programming terminal 10 to the PC processor 24' in FIG. 2. The PC processor 24' then communicates the BT file 137 across the backplane 41 as seen in FIG. 2 to the motion program I/O module 54.

As seen in FIG. 21, the first DOWNLOAD block 230 includes a FILE ID word 231 as the first word, the second word 232 is a sequence number set to "1" and the next block 233 of the 61 words is available for motion program information. The MML file includes a header 234 in which the overall MML file size is included, and this is downloaded to the motion control I/O module 54, which will then calculate the number of BT files needed to transfer the MML file.

The FILE ID word includes 16 bits with the first five bits signifying the file operation, such as MML file download, MML file upload, AMP download, AMP upload, MML file delete, MML file copy, MML file rename and others. The next seven bits contain a file number for identifying the file. The last four bits identify one of several types of motion control I/O modules.

The signature block 230 is transferred to the motion control I/O module 54, and the programmable controller processor 24' sets up a read block transfer from the motion control I/O module 54 to obtain data for a reply message to the programming terminal 10. The reply block 235 is returned with the same FILE ID word 231 as the first word, a command error word 236 as the second word, and a segment number word 237 defining the number of segments needed to transfer the file. The next sixty words 238 of the reply block 234 are ignored at the receiving end.

After receiving and processing the reply to the signature block in a download operation, the programming terminal 10 sends a second data packet 239, with the FILE ID word 231, a segment identifier 240 and the next block 241 of 61 words of data. The programming terminal 10 continues to send blocks to the motion control I/O module 54 without reply for intermediate segments until the last segment is reached. When the last block 242, with FILE ID word 231 and a segment identifier 243, is transmitted downstream and received, the motion control I/O module 54 replies with a reply block 245 including the FILE ID word 231, and a transaction error word 246. The rest of the block 245 carries data 247 that is ignored. The command error word 236 in the first reply block 235 signifies whether the command to download can or cannot be executed, whereas the transaction error word 246 reports errors in actual data transfer.

FIG. 22 shows the sequence of blocks which are communicated for an UPLOAD command. The first block 250 from the programming terminal 10 includes a FILE ID word 251 as discussed for the DOWNLOAD command. The segment number word 252 carries the value "0" and the next 61 words 253 are zeroes. The first reply block 254 includes the FILE ID word 251, a command error word 255, a segment word 256 with the number of segments in the file and a word 257 with the size of the last packet in the upload transaction. The remaining data 258 is ignored.

Assuming no error is reported, the motion control I/O module 54 then responds to a second read block transfer with a reply block 260 with the FILE ID word 251, and the first segment identifier 261 in the sequence of uploaded segments and 61 words of data. This BT file 137 is incorporated in a data packet 135 sent to the programming terminal 10. A number of such intermediate blocks may be sent concluding with transmission of the last block 262, which includes the FILE ID word 251, the transaction error code 263 and the last words of data 264 in the file up to 61 words. If there are less than 61 words, the remaining space in the block is filled with zeroes, and these will be ignored at the receiving end after examining the last packet size number.

J. Operation of the Motion Control I/O Module

Referring to FIG. 12, the motion planning processor 114 on the motion control I/O module 54 executes firmware routines stored in a PROM 270 to transfer data to and from areas in RAM 115 where the motion control program is executed. The processor 114 is connected to these memories by address, data and control buses represented generally by element 271.

Figure 23:
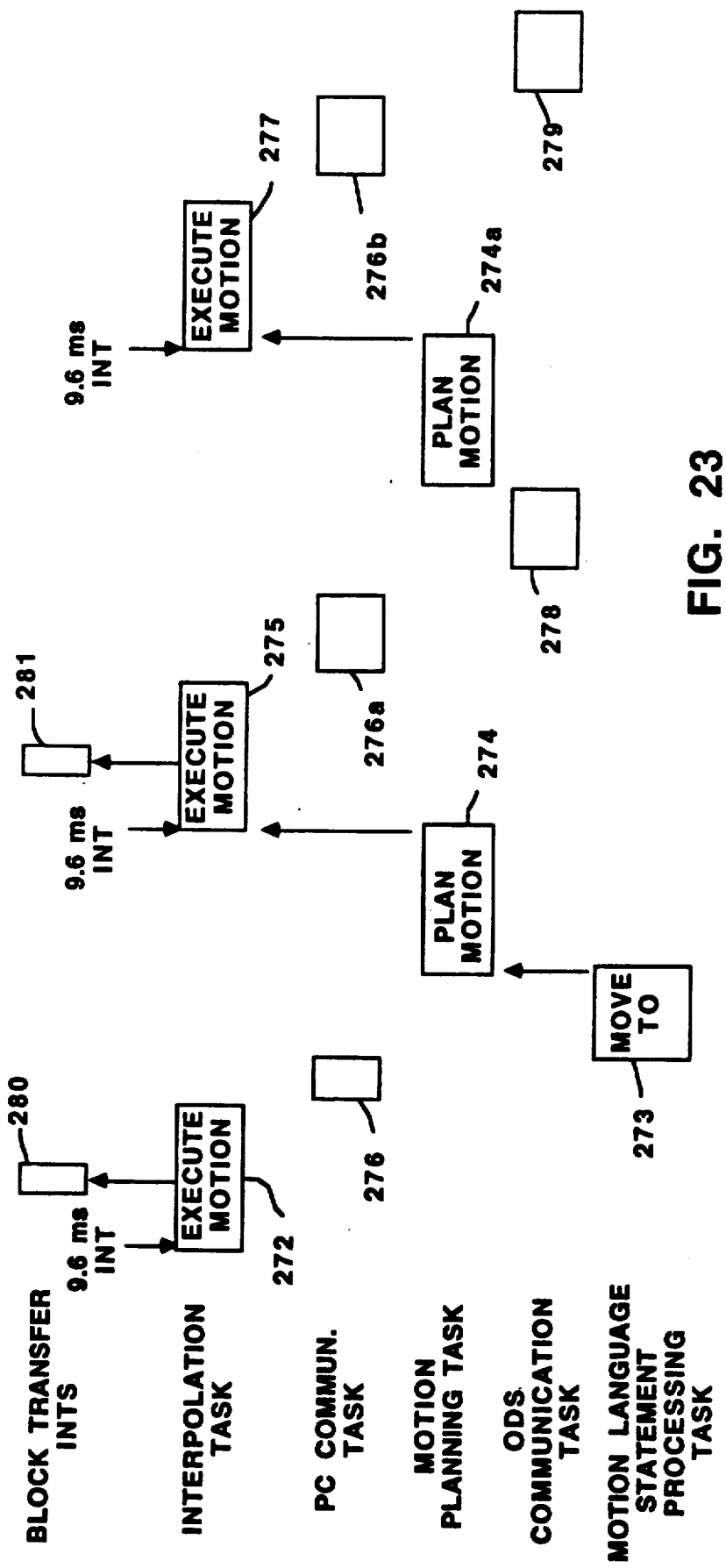
FIG. 23 is a graph of firmware routines executed by the motion control I/O module as a function of time.

The firmware, as represented in FIG. 23, includes routines for executing an Interpolation task in time slices 272, 275 and 277, a Motion Language Statement Processing task in time slice 273, a Programmable Controller (PC) Communication task in time slices 276, 276a and 276b, a Motion Planning task in time slices 274 and 274a and an ODS task in time slice 278 and 279. These tasks are executed in priority with the highest priority task being shown to the top of FIG. 23, and the lowest priority task being shown towards the bottom of FIG. 23.

The Interpolation task is executed in time slices 272, 275 and 277, which occur in response to 9.6-millisecond timing interrupts and the task runs to completion. During this task motion commands are executed. The Motion Planning task is executed as a prelude to executing motion, as represented by time slice 274. In order to plan motion, some preliminary processing of statements in the MML program such as "Move To" must be made by the Motion Language Processing Task as represented by time slice 273.

The PC Communication task, represented by time slices 276, 276a and 276b, is executed at lower priority than the Interpolation task 272, 275 and 277, but at higher priority than the ODS task represented by time slices 278 and 279. During the PC Communication task 276, 276a, block transfer I/O data is processed on the I/O module 54 in a manner to be described in more detail below. The ODS task 278 and 279 is concerned with loading and unloading the motion program files from the area in memory where the program files are executed to control motion. The highest priority for the relevant firmware belongs to interrupt routines such as the Block Transfer INT routine represented by time slices 280 and 281. This routine also relates to the handling of block transfer I/O data on the motion control I/O module 54.

Figure 24:
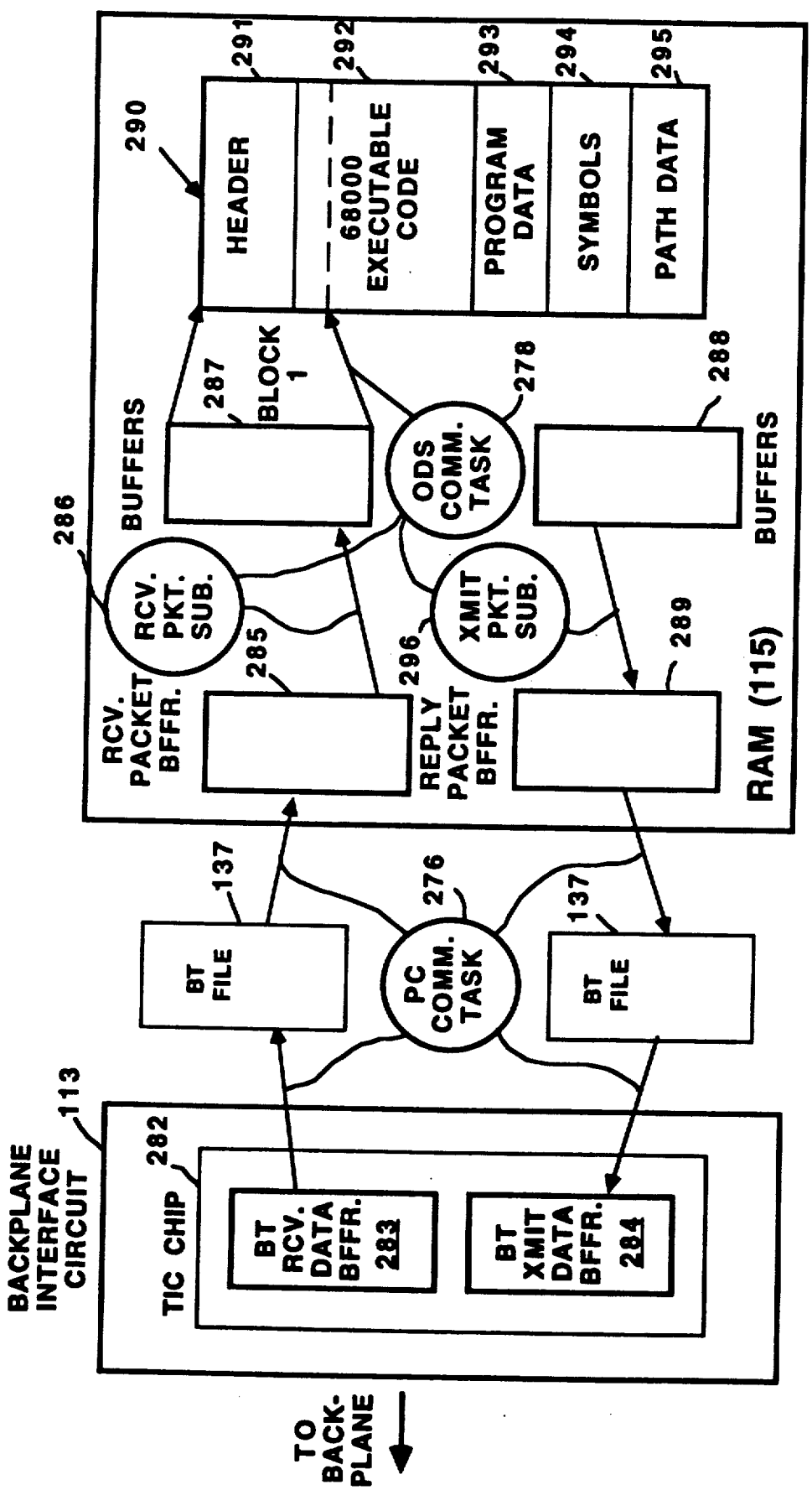
FIG. 24 is a data flow diagram of the motion control I/O module.

Referring to FIG. 24, the backplane interface circuit 113 is shown with the TIC chip 282, disclosed in Makovyak et al., U.S. patent application Ser. No. 249,415 filed Sep. 23, 1988, now U.S. Pat. No. 5,065,314. This circuit includes BT receive and BT transmit buffers 283, 284 for BT files 137 transferred to and from the PC system processor 24'. As part of the BT transfer sequence, a module control byte (MCB) is also received by the TIC chip 282 prior to the BT file. This generates an interrupt signal to the motion planning processor 114 which then executes a first cycle of the Block Transfer INT Routine 280 represented in FIG. 23. The block size and direction of transfer are contained in the MCB, so the motion planning processor 114 checks the size and determines, that for a 63-word block, certain flags should be set to signal the PC Communication task 276 that a 63-word block has been received through the network. If one of the 22-word blocks is detected, other flags are set, so that these blocks will be handled in a different fashion.

When the PC Communication task 276 runs, it detects the flags for a 63-word block, and it will in turn set a DH_PKT_RCVD flag to signal that the BT file 137 relates to the peer-to-peer network 22'. The TIC chip 282 generates a second interrupt when its receive buffer 283 is full, which again signals the motion planning processor 114 to execute a second cycle of the Block Transfer INT routine 281 seen in FIG. 23. During this routine flags are set, so that when the PC Communication task 276 runs again, it will transfer the BT file 137 from the receive buffer 283 to a receive packet buffer 285 earmarked for data received through the peer-to-peer network 22'.

Figure 25:
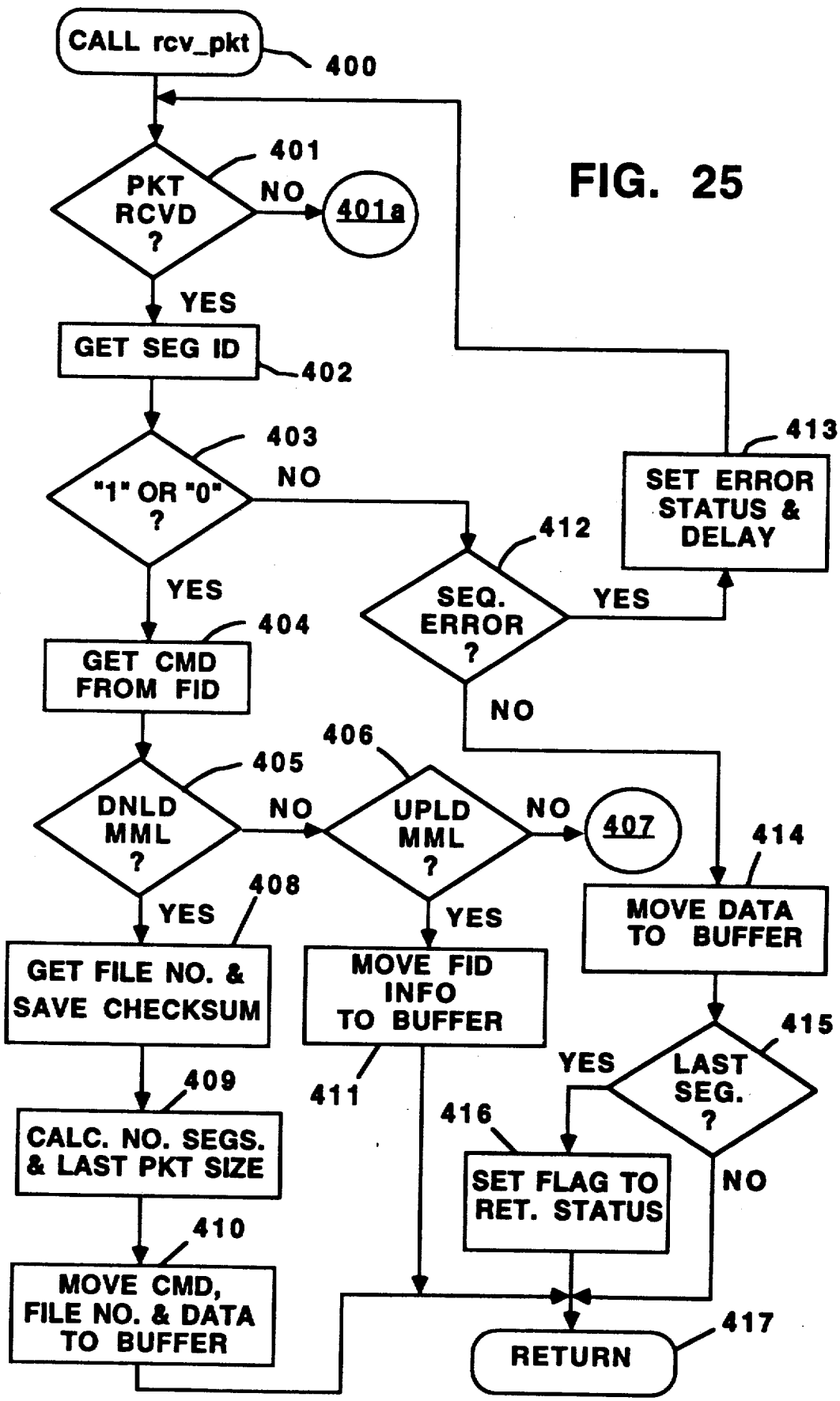

Following execution of the PC Communication task 276, the ODS task 278, 279 is executed, and it calls a rcv_packet subroutine 286 as represented by start block 400 in FIG. 25. As represented by decision block 401, instructions in the routine are executed to determine if the DH_PKT_RCVD flag (a control bit) has been set by the PC Communication task 276 to signal that a new data packet 135 has been received through the peer-to-peer network 22' If this result is negative, as represented by the "NO" branch, the routine goes on to check for communication through the serial ports on the front of the module, and this is represented by connector 401a, which connects to a portion of the routine that is not related to the present invention. If this result is positive, as represented by the "YES" branch from decision block 401, further instructions are executed to get the segment ID word, as represented by process block 402, and to determine whether the segment ID number is a "1" or a "0" which would represent a DOWNLOAD command or an UPLOAD command, respectively, as represented by decision block 403. If this result is positive, as represented by the "YES" result, further instructions are executed to get the command from the FILE ID word, as represented by process block 404. As represented by decision block 405, the command is tested to determine whether it is a DOWNLOAD MML command. If this result is negative, as represented by the "NO" branch, further instructions are executed to to determine whether it is an UPLOAD MML command, as represented by decision block 406. If neither of these commands is detected, the routine checks for other commands, such as, DOWNLOAD AMP, UPLOAD AMP, RENAME, COPY or DELETE, in a portion represented by connector 407, however, that portion of the routine will not be described, as discussion of the first two commands provides a sufficient example.

If the command is a DOWNLOAD MML command, as represented by the "YES" result from block 405, the following steps are taken. The file number and a file checksum are identified and saved, as represented by process block 408. Then, as represented by process block 409, the number of segments to be downloaded and the size of the last packet are calculated by calculating the size of the MML file and then dividing by the packet size. The remainder becomes the size of the last packet. Then, as represented by process block 410, the command, the file number and the data are loaded into the buffers 287 in FIG. 24 for access by another portion of the ODS task 278, 279. If the command is an UPLOAD, as represented by the "YES" result from decision block 406, the UPLOAD command information is moved to the buffers 287 in FIG. 24. This includes the FILE ID information, including the command, file number and control type for an MML file to be uploaded. There is no I/O data to transfer from the UPLOAD command block. Once the DOWNLOAD or UPLOAD information has been transferred, the routine 286 ends with a return to the ODS task 278, 279, as represented by return block 417.

Returning to block 403, the "NO" result implies reception of a second or subsequent block of data. As represented by decision block 412, instructions are executed to check the segment ID word to see if the block has been received out of sequence. If so, an out-of-sequence error is declared, as represented by process block 413 and the routine loops to await reception of a proper block of data. If the sequence ID word is proper, instructions are executed, as represented by process block 414 to move the system I/O data in the block to the buffers 287 for further processing by the ODS task 278, 279. Then, as represented by process block 415, a check is made to see if this is the last segment number. If the result is positive, a flag bit or control bit is set to return the transaction error code status in the next reply, as represented by process block 416. If the check in block 415 shows this is not the last segment, the routine returns to the ODS task, as represented by return block 417, without setting the flag bit for return of the transaction error code status in the next reply.

After the command in the downloaded block has been examined and processed, if it is a DOWNLOAD MML file, the ODS task 278, 279 will move the motion program information from the buffers 287 in FIG. 24 to the area in memory 290 where it will be executed by the motion processing tasks. When ODS task 278, 279 detects the DOWNLOAD MML command in the two words of control information in the command block, it sets up to load incoming 61-word blocks of motion program information in consecutive sections of the memory 290 for executing the program. Similarly, when the ODS task 278, 279 detects the UPLOAD MML command, it sets up to move 61-word blocks to the transmit buffers 289 from consecutive sections of the memory space 290 where the program was executing.

As seen in FIG. 24, an MML program file has a header 291, executable code 292 compiled from the MML program for execution by the 68000 microcomputer, a group of program data 293, a symbol table 294 and a group of path data 295, the last three elements being related to the compiled executable code 291. For this example, it has been assumed the MML file is 183 words, so the first block includes only the header 291 and a portion of the executable code 292. The ODS task 278, 279 moves the blocks into contiguous sections of memory area 290 to reassemble the full MML file.

Figure 26:
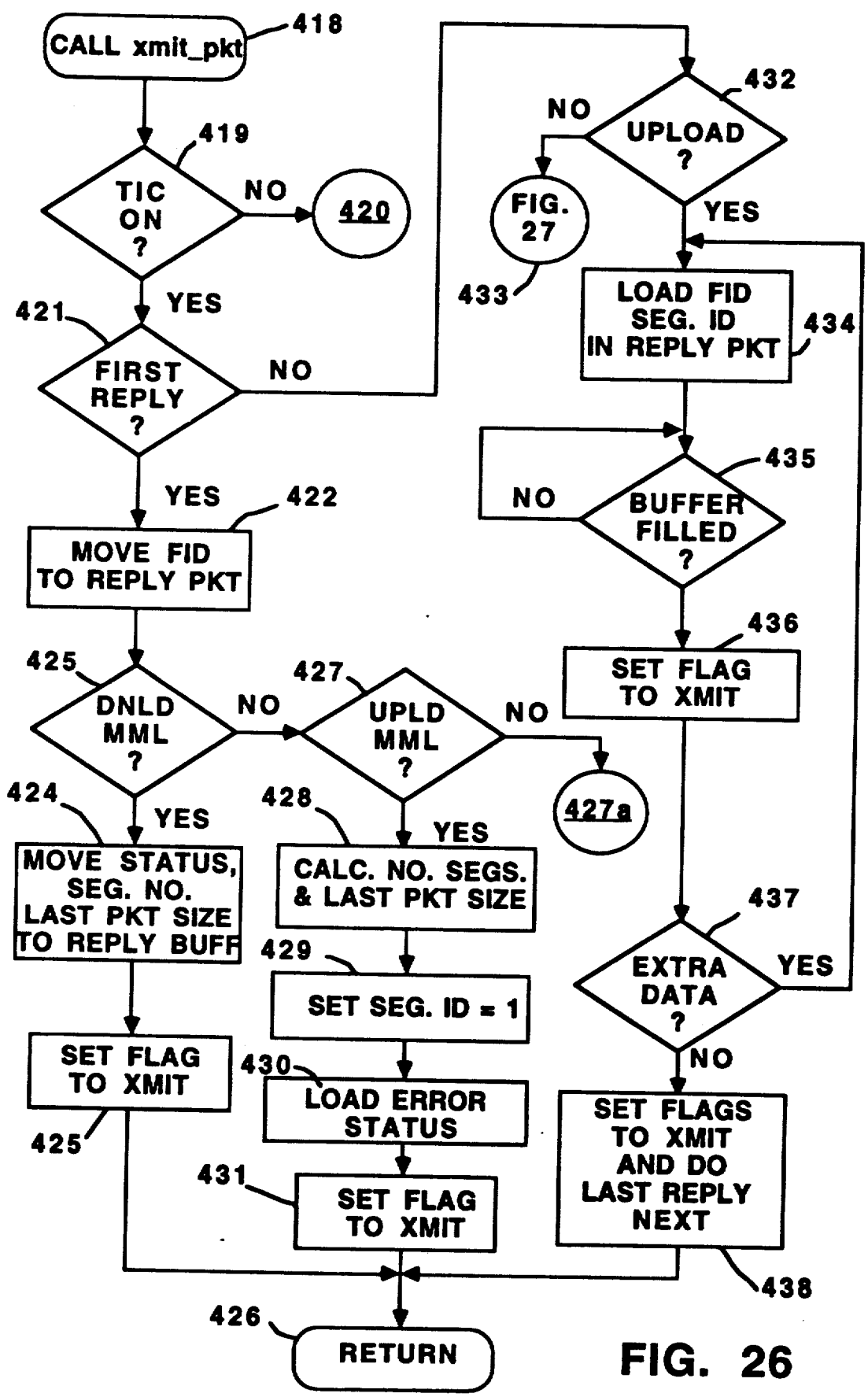
Figure 27:
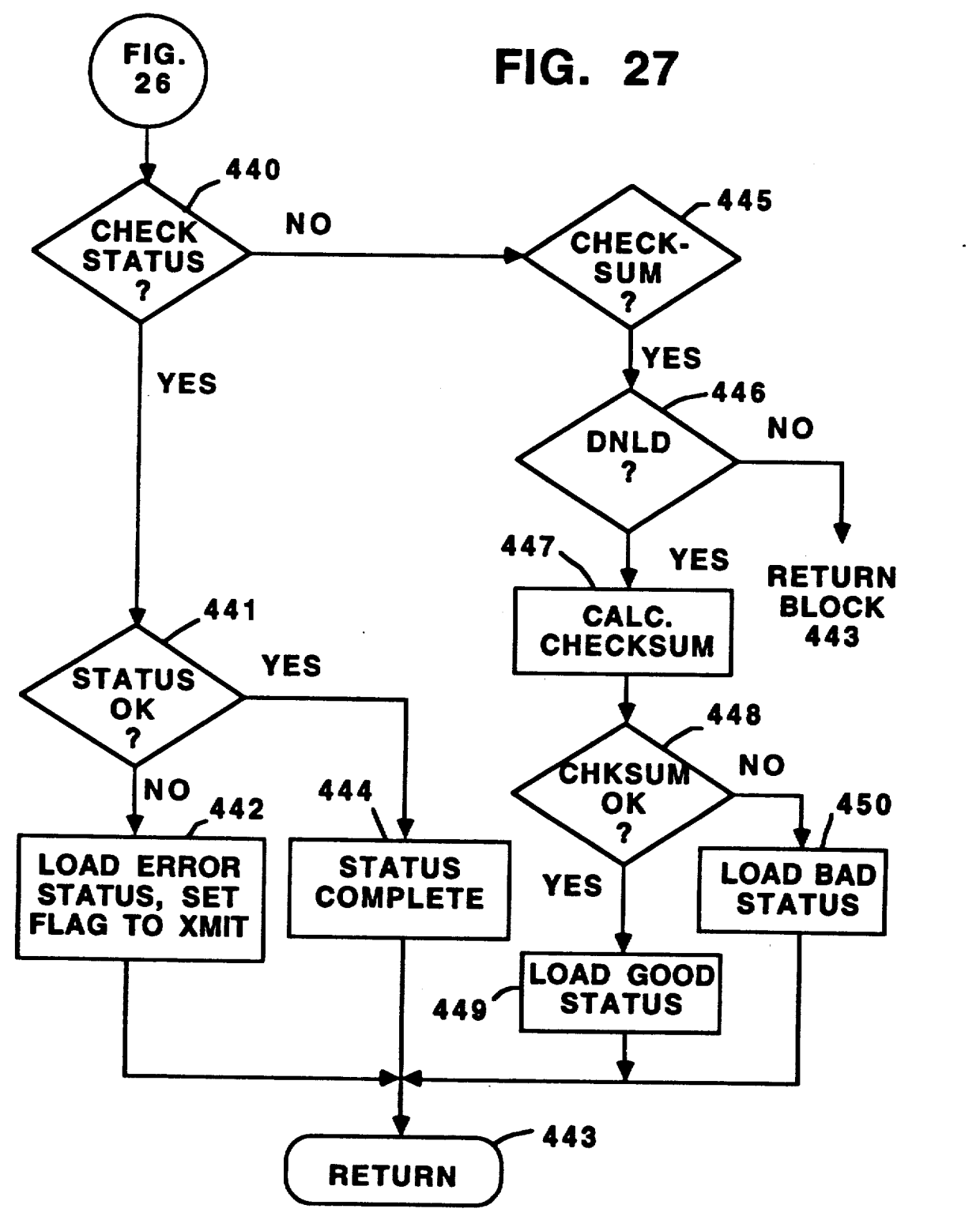

After processing the received packet, the ODS task 278, 279 calls a xmit_packet subroutine 296 shown generally in FIG. 24, and more particularly illustrated in flow charts in FIGS. 26 and 27. After the subroutine is called, as represented by start block 418, instructions are executed, as represented by decision block 419, to see whether communication is being conducted through the TIC chip 282 in FIG. 24, as compared to the serial ports on the front of the module 54. If this is not true, as represented by the "NO" result, the routine goes on to check for communication through the serial ports as represented by connector 420. Assuming communication through the TIC chip 282, as represented by the "YES" result, further instructions are executed as represented by decision block 421 to determine if a reply is to be assembled in response to receiving a first block from the programming terminal 10. If not, as represented by the "NO" result the routine branches to block 432. If the result is positive, as represented by the "YES" result, the FILE ID word is moved into the reply packet buffer 289 in FIG. 24, as represented by process block 422. Next, a check is made as shown by decision block 423 to see if the command is a DOWNLOAD MML command. If the result is positive, as shown by the "YES" result, the command error status, the segment ID word and the last packet size are moved into the reply packet buffer 289 in FIG. 24. Then, as represented by process block 424, a flag is set to inform the PC Communication task 276 to transmit the block to the TIC chip 282 for block transfer to the PC processor 24'. The subroutine then returns to the ODS task 278, 279, as represented by return block 426.

Returning to decision block 424, if the command is not a DOWNLOAD MML command, instructions are executed, as represented by decision block 427 to see if the command is an UPLOAD MML command. If this test is positive, the number of segments in the file to be uploaded and the size of the last packet of system I/O data are calculated, as represented by process block 428. The number of segments in the file and the size of the last packet are then loaded into the reply packet buffer 289, as represented by process block 429. The command error status is checked, as represented by process block 430, and if satisfactory is loaded into the packet buffer 289. Then, as represented by process block 431, a flag is set to inform the PC Communication task 276 to transmit the first UPLOAD reply block to the TIC chip 282 for block transfer to the PC processor 24'. The subroutine then returns to the ODS task 278, 279, as represented by return block 426.

Returning to decision block 427, if the command is some other command than UPLOAD MML, the subroutine checks for and processes replies for these other commands as represented by connector 427a. Returning to decision block 421, if the reply is not a first reply, instructions are executed as represented by decision block 432, to see if intermediate reply packets should be assembled in response an UPLOAD command. If this result is negative, the routine branches to FIG. 27, as represented by connection 433, to test for a last reply block.

If the check in block 432 produces a "YES" result, instructions are executed as represented by process block 434 to load the FILE ID word and segment ID word in the reply packet buffer 289. Next, system I/O data (the MML data) is loaded until the buffer is filled. A check is then made to see if when the buffer is full, as represented by decision block 435. As shown by the "NO" result, the routine waits for data to fill the buffer. When the buffer is filled, as shown by the "YES" result, a flag is set to inform the PC Communication task 276 to transmit the first UPLOAD reply block, as represented by process block 436.

Next, as shown by decision block 437, instructions are executed to see if there is extra system I/O data to be transmitted, beyond that need to fill the buffer, and necessitating another reply packet. If the result of this test is "YES", the subroutine will loop to assemble successive intermediate packets through execution of blocks 434, 435 and 436.

When the data left to be uploaded is less than or equal to sixty-one words, the result from executing decision block 437 is negative, and the subroutine proceeds to execution of block 438 to set a last reply flag before returning through block 426. The next time the subroutine is called it will branch at decision block 432 to process the last reply.

Referring next to FIG. 27, branching to this part of the subroutine implies checking for the final transaction error code status to return to the programming terminal in a reply packet. First, instructions are executed, as represented by decision block 440 to see if a status word accessible to other routines executed on the I/O module 54 shows any errors. If the status is OK during the first time through this section, as represented by the "YES" result from decision block 441, a flag is set that the status check is complete as represented by process block 444. If an error has been detected, as represented by the "NO" result from decision block 441, the transaction error code is loaded into the reply buffer 289 and the transmit flag is set as represented by process block 442. The routine then returns through return block 443.

If the status check is OK, the next time through the section, the result in decision block 440 will be "NO" and a check will made as to whether a checksum should be calculated and sent back in a reply for a DOWNLOAD operation, as represented by decision block 446 and process block 447. The checksum is calculated for the received data and compared to a downloaded checksum in the MML file header. According to whether the checksum test is positive or negative, the good or bad transaction error status is loaded into the last reply packet, as represented by blocks 449 and 450, and the subroutine returns to the ODS task 278, 279. The reply packet is then moved to the TIC ship 282 by the PC Communication task 276.

The description and drawings illustrate how the blocks of data transmitted over the network are transferred to the motion control I/O module 54 and then processed on the module to complete the uploading or downloading of motion program information.

One aspect of this system communication is the passing of files through the programmable controller system processor in a manner that is transparent to the normal function of the system processor in executing its user application program. Another aspect is the semi-handshaking protocol and organization of the data packets to handle large files in multiple packets and to provide error checking.

This description has been by way of examples of how the invention can be carried out. Those with knowledge in the art will recognize that various details may be modified in arriving at other detailed embodiments, and that many of these embodiments will come within the scope of the invention. Therefore to apprise the public of the scope of the invention and the embodiments covered by the invention the following claims are made.

We claim:

1. A method of transferring program information between a programming terminal and an I/O module through a programmable controller system processor, the method comprising:
   connecting the programming terminal to the programmable controller system processor through a peer-to-peer network;
   selecting a mode of communication for the programming terminal to designate a peer-to-peer network for transfer of program information between the programming terminal and the programmable controller processor;
   entering through the programming terminal and storing in memory a programmable controller system-mapped I/O address for use in transferring a file of program information between the programming terminal and the I/O module through the programmable controller system processor;
   entering through the programming terminal and storing in memory a command to transfer a file of program information between the programming terminal and the I/O module through the programmable controller system processor, wherein the file of program information includes one or more multiword blocks of program information; and
   in response to the command to transfer the file of program information, executing the transfer of a multiword block of program information between the programming terminal and the programmable controller system processor through the peer-to-peer network, including transmitting to the programmable controller system processor a system-mapped I/O address and a command to transfer a multiword block of program information between the programmable controller processor and the I/O module; and
   in response to the command to transfer a multiword block of program information, directing the programmable controller system processor to execute transfer of the block of program information between the programmable controller system processor and the I/O module at the system-mapped I/O address transmitted through the peer-to-peer network.

2. The method of claim 1, further comprising
   the programming terminal embedding a second version of the command to transfer the file of program information in the block of program information to be transferred between the programming terminal and the I/O module; and
   the programming terminal embedding in the multiword block of program information to be transferred a block sequence number to identify a first block in a sequence of blocks containing program information.

3. The method of claim 1, wherein
   in response to the command, the transfer of the program information between the programming terminal and the programmable controller system processor is in the direction from the programming terminal to the programmable controller system processor; and
   wherein the programmable controller system processor is directed to execute transfer of a multiword block of the program information in the direction from the programmable controller system processor to the I/O module.

4. The method of claim 1, wherein
   in response to the command, the transfer of the program information between the programming terminal and the programmable controller system processor is in the direction from the programmable controller system processor to the programming terminal; and
   wherein the programmable controller system processor is directed to execute a transfer of a multiword block of the program information in the direction from the I/O module to the programmable controller system processor.

5. The method of claim 1, wherein the program information comprises program statements compiled from a high-level program language.

6. The method of claim 1, wherein the program information comprises operating parameters related to a machine controlled by the I/O module.

7. The method of claim 1, further comprising:
   the programming terminal receiving a status reply from the programmable controller system processor to confirm processing of the command to transfer program information; and
   in response to receiving the status reply, the programming terminal transferring a second block of the program information over the peer-to-peer network between the programming terminal and the programmable controller system processor; and
   wherein programming terminal provides each of the first and second blocks of control information with a respective block sequence number to identify the block as one of a sequence of blocks making up the file of program information.

8. The method of claim 7, further comprising:
   generating a status reply to the programming terminal to confirm that at least two blocks of program information have been transferred between the programmable controller system processor and the I/O module; and
   receiving the status reply to confirm that the file of program information has been transferred between the programmable controller system processor and the I/O module.

9. A programmable controller processor for initiating block transfers of information to a I/O module in response to block transfer commands from two different sources, the programmable controller comprising:

means responsive to a ladder language control program instruction including a block transfer command for generating a first entry in a queue specifying the location of the block transfer data, the system-mapped I/O address of the I/O module and the requested number of words of block transfer data;

means responsive to the first entry in the queue for executing the block transfer of data in cooperation with the I/O module;

means responsive to a network message including a block transfer command for generating a second entry in the queue specifying the location of the block transfer data, the system-mapped I/O address of the I/O module and the requested number of words of block transfer data; and wherein the means responsive to the first entry in the queue is further responsive to the second entry in the queue for executing a second block transfer in cooperation with the I/O module.

10. A programmable controller processor of claim 9, further comprising:

means for clearing the first entry in the queue in response to selection of a PROGRAM mode in which the ladder language program instruction stops executing.

11. A method of uploading and downloading program information between a remote programming terminal and an I/O module through a programmable controller system processor communicating with the I/O module, the method comprising:

storing a file of program information as a single file for purposes of executing a program to control a controlled device; and converting received blocks of information to the single file when downloading the file of program information from the remote programming terminal;

converting the single file to blocks of information when uploading the file of program information to the remote programming terminal;

storing the blocks of information for communication to or from the remote programming terminal through the programmable controller system processor; and responding to commands in blocks of information received from the remote programming terminal through the programmable controller system processor for communicating the file of program information as a sequence of blocks of program information.

12. The method of claim 11, further comprising the step of discriminating between a block of program information to be transferred between the programmable controller system processor and a remote programming terminal and a block of information to be transferred only between the programmable controller system processor and the I/O module.

* * * * *